United States Patent
Kanbayashi

(10) Patent No.: US 9,239,509 B2
(45) Date of Patent: Jan. 19, 2016

(54) OPTICAL DEFLECTOR

(71) Applicant: Sharp Kabushiki Kaisha, Osaka-shi, Osaka (JP)

(72) Inventor: Yuuichi Kanbayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 14/349,778

(22) PCT Filed: Oct. 9, 2012

(86) PCT No.: PCT/JP2012/006466
§ 371 (c)(1),
(2) Date: Apr. 4, 2014

(87) PCT Pub. No.: WO2013/054507
PCT Pub. Date: Apr. 18, 2013

(65) Prior Publication Data
US 2014/0293208 A1    Oct. 2, 2014

(30) Foreign Application Priority Data
Oct. 14, 2011   (JP) ................. 2011-226872

(51) Int. Cl.
*G02F 1/13* (2006.01)
*G02F 1/29* (2006.01)
*G02F 1/1335* (2006.01)
*G02B 27/22* (2006.01)

(52) U.S. Cl.
CPC .......... *G02F 1/292* (2013.01); *G02F 1/133502* (2013.01); *G02B 27/2214* (2013.01)

(58) Field of Classification Search
CPC ........................................... G02B 5/1842
See application file for complete search history.

(56) References Cited

U.S. PATENT DOCUMENTS

| 2011/0228181 A1* | 9/2011 | Jeong et al. | 349/15 |
| 2013/0229587 A1* | 9/2013 | Takama et al. | 349/33 |
| 2013/0265509 A1* | 10/2013 | Choi et al. | 349/15 |
| 2014/0253832 A1* | 9/2014 | Lee et al. | 349/15 |

FOREIGN PATENT DOCUMENTS

JP    2011-039314 A    2/2011

OTHER PUBLICATIONS

Official Communication issued in International Patent Application No. PCT/JP2012/006466, mailed on Nov. 6, 2012.

\* cited by examiner

*Primary Examiner* — Timothy L Rude
(74) *Attorney, Agent, or Firm* — Keating & Bennett, LLP

(57) ABSTRACT

A first element substrate (20a) including an interlayer insulating layer (15a) provided on a first transparent substrate (10a), a plurality of first transparent electrode (16) extending parallel to each other, each first transparent electrode (16) being provided at a bottom (B) of an associated one of a plurality of grooves (S) in the interlayer insulating layer (15a), and a planarizing layer (17) covering the first transparent electrodes (16), filling the grooves (S), and having a refractive index equal to a refractive index of the interlayer insulating layer (15a), a second element substrate (30a) including a second transparent electrode (21) provided on a second transparent substrate (10b), and a liquid crystal layer (40) provided between the first element substrate (20a) and the second element substrate (30a) are provided.

10 Claims, 23 Drawing Sheets

OPTICAL DEFLECTOR

TECHNICAL FIELD

The present invention relates to optical deflectors, and specifically to an optical deflector using liquid crystal.

BACKGROUND ART

Optical deflectors using liquid crystal are configured such that incident light is output after the deflection direction of incident light is changed by forming predetermined electric field distribution in a liquid crystal layer provided between a pair of substrates. Here, the optical deflector using liquid crystal includes, for example, a first substrate on which a plurality of transparent electrodes are provided in a striped pattern, a second substrate disposed to face the first substrate and provided with a transparent common electrode, and a homogeneous alignment type liquid crystal layer provided between the first substrate and the second substrate, wherein the common electrode is grounded, and a predetermined voltage is applied to each transparent electrode, so that a spatial refractive index modulation region is induced in the liquid crystal layer, thereby forming a blazed diffraction grating in the liquid crystal layer.

Incidentally, in such an optical deflector having the above-described configuration, a short circuit may be formed, for example, between the transparent electrodes adjacent to each other due to a residue, or the like, resulting from etching in forming the transparent electrodes. When the short circuit is formed, the optical deflector generates unnecessary diffracted light at an angle different from a desired diffraction angle during operation. This may make control of the diffraction angle difficult or may reduce the diffraction efficiency.

For example, Patent Document 1 describes a horizontal electric field type liquid crystal device including an array substrate provided with a common electrode and a conductive auxiliary layer which are formed by forming an interlayer insulating layer etched to form a reverse taper shape between electrodes, and separately forming an indium tin oxide (ITO) film in a self-aligning manner on the interlayer insulating layer.

CITATION LIST

Patent Document

PATENT DOCUMENT 1 Japanese Unexamined Patent Publication No. 2011-39314

SUMMARY OF THE INVENTION

Technical Problem

When the technique described in Patent Document 1 in which a common electrode and a conductive auxiliary layer are formed in the horizontal electric field type liquid crystal device is applied to the above-described optical deflector, short circuits between the transparent electrodes can be reduced by a groove structure of an underlying film provided under the transparent electrodes. However, during operation, the periodical groove structure of the underlying film generates unnecessary diffracted light, thereby generating background noise, which may reduce the diffraction efficiency.

In view of the foregoing, it is an objective of the present invention to reduce short circuits between transparent electrodes and reduce unnecessary diffracted light during operation.

Solution to the Problem

To achieve the object, in the present invention, each of a plurality of first transparent electrodes is provided at a bottom of an associated one of a plurality of grooves formed in an interlayer insulating layer, a planarizing layer covers the first transparent electrodes and to fill the grooves, and the refractive index of the planarizing layer matches the refractive index of the interlayer insulating layer.

Specifically, an optical deflector according to the present invention includes: a first element substrate including a first transparent substrate, an interlayer insulating layer which is provided on the first transparent substrate and in which a plurality of grooves extend parallel to each other, a plurality of first transparent electrodes which extend parallel to each other and each of which is provided at a bottom of an associated one of the grooves in the interlayer insulating layer, and a planarizing layer covering the first transparent electrodes, filling the grooves, and having a refractive index equal to a refractive index of the interlayer insulating layer; a second element substrate including a second transparent substrate, and a second transparent electrode provided on the second transparent substrate to face the planarizing layer of the first element substrate, and a liquid crystal layer provided between the first element substrate and the second element substrate.

With this configuration, the grooves (recessed lines) extend parallel to each other at a surface of the interlayer insulating layer of the first element substrate opposite to the first transparent substrate, and each of the first transparent electrodes is provided at the bottom of an associated one of the grooves. Therefore, each of projection lines corresponding to the recessed lines in the interlayer insulating layer is disposed between an associated pair of the first transparent electrodes adjacent to each other, which physically reduces short circuits between the first transparent electrodes. The interlayer insulating layer has a physical periodic structure including the grooves extending parallel to each other. However, each of the grooves is filled with the planarizing layer having the refractive index equal to the refractive index of the interlayer insulating layer with the first transparent electrode being provided at the bottom of the groove. This means that the interlayer insulating layer has no optical periodic structure. Therefore, when a predetermined signal voltage is applied to each first transparent electrode of the first element substrate and the second transparent electrode of the second element substrate to operate the optical deflector to form a blazed diffraction grating in the liquid crystal layer, control of the diffraction angle of incident light at the first transparent substrate of the first element substrate (or the second transparent substrate of the second element substrate) is ensured, thus unnecessary diffracted light is not likely to be included in light output from the second transparent substrate of the second element substrate (or the first transparent substrate of the first element substrate). Therefore, short circuits between the transparent electrodes are reduced, and unnecessary diffracted light during operation is reduced.

The optical deflector may further include: a plurality of third transparent electrodes extending parallel to each other, wherein the interlayer insulating layer has a plurality of top portions each located between an associated pair of the grooves, and each of the third transparent electrodes is provided between an associated one of the top portions and the planarizing layer.

With this configuration, each of the first transparent electrodes is provided at the bottom of each of the grooves formed in the interlayer insulating layer, and each of the third transparent electrodes is provided on an associated one of the top portions of the interlayer insulating layer. Therefore, the first transparent electrodes and the third transparent electrodes are alternately provided in the first element substrate. Thus, the first element substrate has a small pitch of the transparent electrodes compared to the case where only the first transparent electrodes are provided, so that the diffraction angle θ increases based on the relational expression sin θ=λ/(n×d). Here, in the relational expression, λ represents the wavelength of the incident light, n is the number of transparent electrodes forming a unit of a diffraction grating, and d is the pitch of the transparent electrodes.

The first transparent electrodes may be extended to one end of the first element substrate, and the third transparent electrodes may be extended to the other end of the first element substrate.

With this configuration, the first transparent electrodes are extended to one end of the first element substrate, and the third transparent electrodes are extended to the other end of the first element substrate. Therefore, the first transparent electrodes and the third transparent electrode are extended to opposite ends in the order of their arrangement on the first element substrate. Thus, even when the pitch of the transparent electrodes is small, it is possible to ensure the connectivity of the transparent electrodes to, for example, signal interconnects for applying signal voltages to the transparent electrodes.

The second element substrate may include an interlayer insulating layer which is provided on the second transparent substrate and in which a plurality of grooves extend parallel to each other, and a planarizing layer filling the grooves and having a refractive index equal to a refractive index of the interlayer insulating layer of the second element substrate and the second transparent electrode may include a plurality of second transparent electrodes which extend parallel to each other and each of which is provided between a bottom of an associated one of the grooves in the interlayer insulating layer of the second element substrate and the planarizing layer of the second element substrate.

With this configuration, the grooves extend parallel to each other at a surface of the interlayer insulating layer of the second element substrate opposite to the second transparent substrate, and each of the second transparent electrodes is provided at the bottom of an associated one of the grooves. Therefore, the voltage of the liquid crystal layer can be controlled not only at the first element substrate but also at the second element substrate, and the magnitude of phase modulation can be increased compared to the case where the second element substrate includes a single second transparent electrode. Here, each of projection lines corresponding to the grooves (recessed lines) in the interlayer insulating layer is disposed between an associated pair of second transparent electrodes adjacent to each other, which physically reduces short circuits between the second transparent electrodes of the second element substrate. The interlayer insulating layer of the second element substrate has a physical periodic structure including the grooves extending parallel to each other. However, each of the grooves is filled with the planarizing layer having the refractive index equal to the refractive index of the interlayer insulating layer with the second transparent electrode being provided at the bottom of the groove. This means that the interlayer insulating layer has no optical periodic structure.

The optical deflector may further include: a plurality of fourth transparent electrodes extending parallel to each other, wherein the interlayer insulating layer of the second element substrate has a plurality of top portions each located between an associated pair of the grooves in the interlayer insulating layer of the second element substrate, and each of the fourth transparent electrodes is provided between an associated one of the top portions and the planarizing layer of the second element substrate.

With this configuration, each of the second transparent electrodes is provided at the bottom of each of the grooves formed in the interlayer insulating layer of the second element substrate, and each of the fourth transparent electrodes is provided on an associated one of the top portions of the interlayer insulating layer of the second element substrate. Therefore, the second transparent electrodes and the fourth transparent electrodes are alternately provided in second element substrate. Thus, the second element substrate has a small pitch of the transparent electrodes compared to the case where only the second transparent electrodes are provided, so that the diffraction angle θ increases based on the relational expression sin θ=λ/(n×d). Here, in the relational expression, λ represents the wavelength of the incident light, n is the number of transparent electrodes forming a unit of a diffraction grating, and d is the pitch of the transparent electrodes.

In at least one of the first element substrate or the second element substrate, the planarizing layer may cover the interlayer insulating layer.

With this configuration, the planarizing layer covers the interlayer insulating layer in at least one of the first element substrate or the second element substrate. Therefore, filling the grooves in the interlayer insulating layer with the planarizing layer is ensured.

In at least one of the first element substrate or the second element substrate, the interlayer insulating layer and the planarizing layer may be made of an identical material.

With this configuration, the interlayer insulating layer and the planarizing layer are made of an identical material in at least one of the first element substrate or the second element substrate. Therefore, the refractive index of the interlayer insulating layer and the refractive index of the planarizing layer are equal to each other in at least one of the first element substrate or the second element substrate.

In at least one of the first element substrate or the second element substrate, each groove in the interlayer insulating layer may have a width increasing toward the bottom of the groove.

With this configuration, each groove in the interlayer insulating layer is formed to have a so-called reverse tapered shape such that the width of the groove increases toward the bottom of the groove in at least one of the first element substrate or the second element substrate. Therefore, when the first element substrate includes the first transparent electrodes and the third transparent electrodes, the first transparent electrodes are separated from the third transparent electrodes in a self-aligning manner, and when the second element substrate includes the second transparent electrodes and the fourth transparent electrodes, the second transparent electrodes are separated from the fourth transparent electrodes in a self-aligning manner.

The interlayer insulating layer of the first element substrate may include a first interlayer insulating layer facing the first transparent substrate, and a second interlayer insulating layer which is provided on the first interlayer insulating layer and in which the grooves are formed, and a plurality of first metal layers may be provided on a region of the first interlayer insulating layer exposed from the second interlayer insulating layer so as to be each connected to an associated one of the first transparent electrodes.

With this configuration, the first metal layers are provided on a region of the first interlayer insulating layer of the first element substrate exposed from the second interlayer insulating layer. Therefore, even if there is a residue of a metal film for forming the first metal layers on the first interlayer insulating layer, the second interlayer insulating layer is formed after the formation of the first metal layers. Therefore, short circuits caused due to the residue of the metal film for forming the first metal layer is reduced between the first transparent electrodes provided on the second interlayer insulating layer.

The interlayer insulating layer of the second element substrate may include a first interlayer insulating layer facing the second transparent substrate, and a second interlayer insulating layer which is provided on the first interlayer insulating layer and in which the grooves are formed, and a plurality of second metal layers may be provided on a region of the first interlayer insulating layer of the second element substrate exposed from the second interlayer insulating layer of the second element substrate so as to be each connected to an associated one of the second transparent electrodes.

With this configuration, the second metal layers are provided on a region of the first interlayer insulating layer of the second element substrate exposed from the second interlayer insulating layer. Therefore, even if there is a residue of a metal film for forming the second metal layers on the first interlayer insulating layer, the second interlayer insulating layer is formed after the formation of the second metal layers. Therefore, short circuits caused due to the residue of the metal film for forming the second metal layer is reduced between the second transparent electrodes provided on the second interlayer insulating layer.

Advantages of the Invention

In the present invention, each of a plurality of first transparent electrode is provided at a bottom of an associated one of a plurality of grooves formed in an interlayer insulating layer, a planarizing layer covers the first transparent electrodes and fills the grooves, and the refractive index of the planarizing layer matches the refractive index of the interlayer insulating layer, so that short circuits between the transparent electrodes are reduced, and unnecessary diffracted light during operation is reduced.

DESCRIPTION OF EMBODIMENTS

Embodiments of the present invention will be described in detail below based on the drawings. The present invention is not limited to the embodiments below.

<First Embodiment of the Invention>

Figure 1:
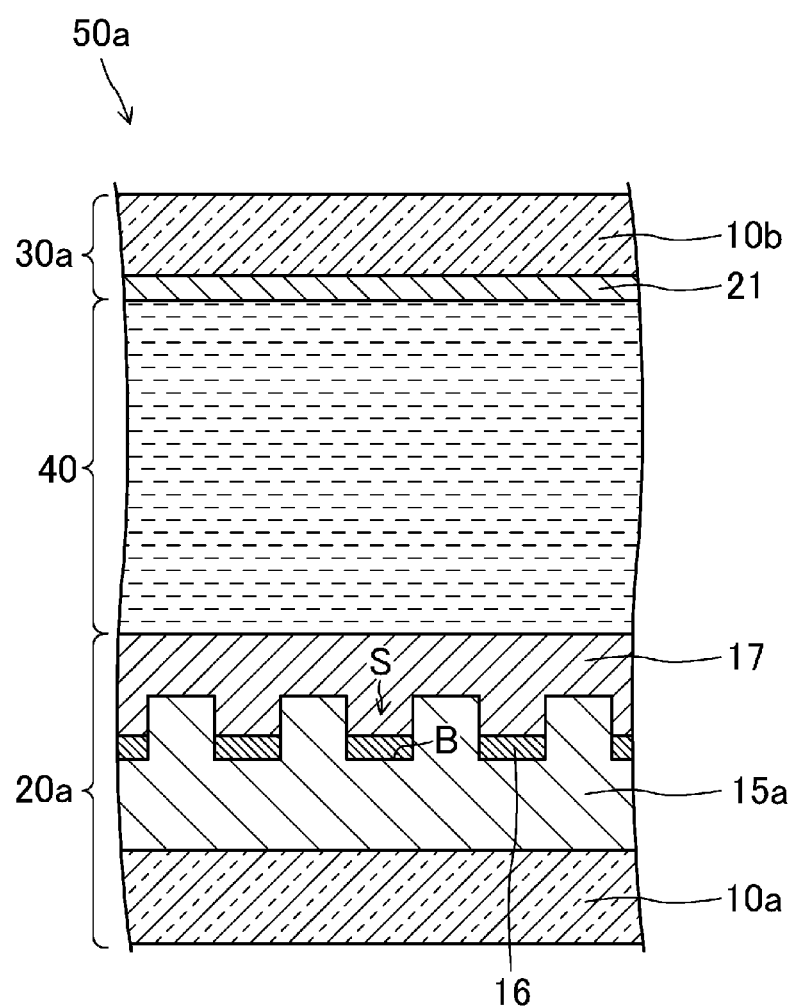
FIG. 1 is a cross-sectional view illustrating an optical deflector according to a first embodiment.
Figure 2:
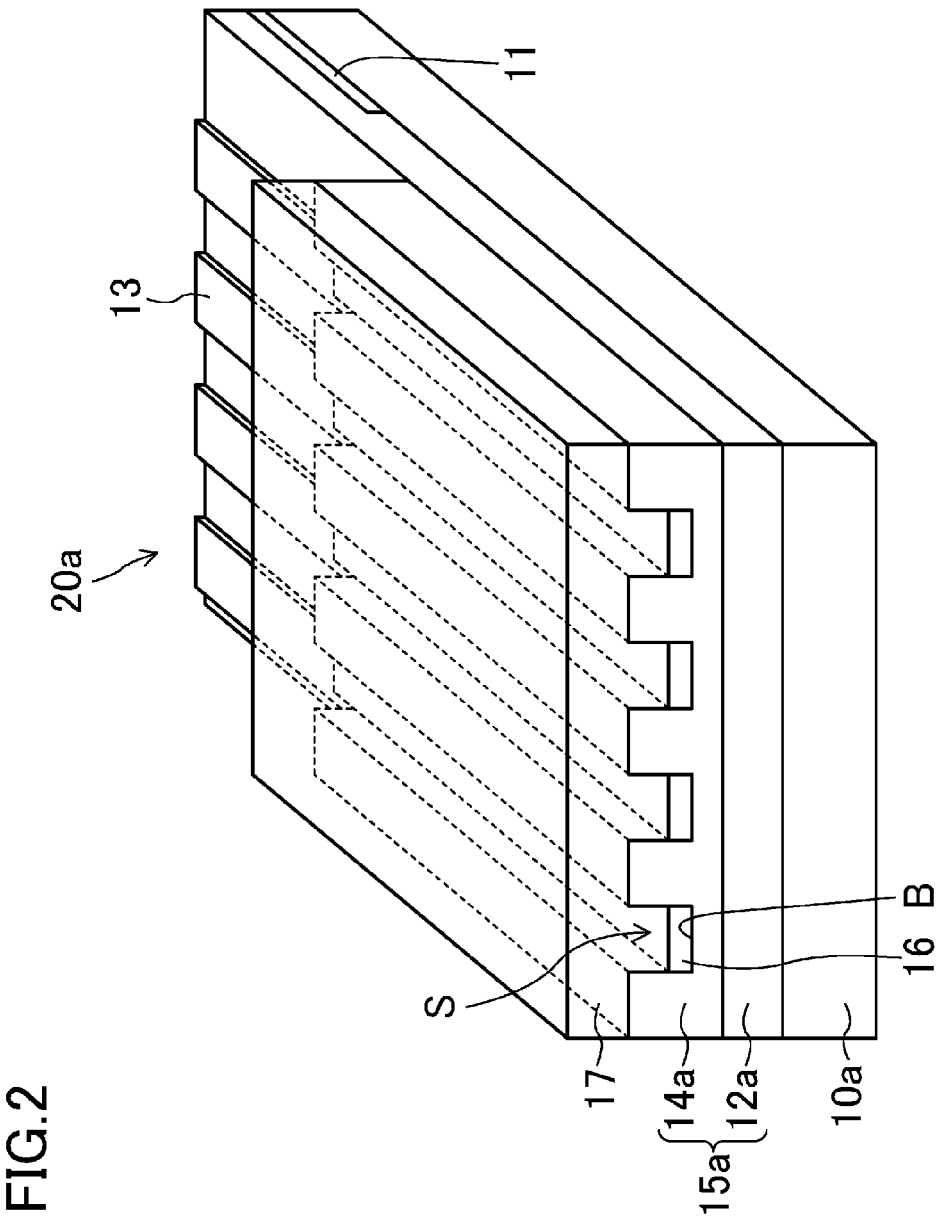
FIG. 2 is a perspective view illustrating a first element substrate included in the optical deflector of the first embodiment.

FIGS. 1-19 illustrate a first embodiment of an optical deflector according to the present invention. Specifically, FIG. 1 is a cross-sectional view illustrating an optical deflector 50a of the present embodiment. FIG. 2 is a perspective view illustrating a first element substrate 20a included in the optical deflector 50a. FIGS. 3-17 which will be described later are views illustrating a method for fabricating the first element substrate 20a, wherein FIG. 8 is a plan view illustrating the first element substrate 20a fabricated by the fabrication method, FIG. 16 is a cross-sectional view illustrating the first element substrate 20a along the line XVI-XVI of FIG. 8, and FIG. 17 is a cross-sectional view illustrating the first element substrate 20a along the line XVII-XVII of FIG. 8.

As illustrated in FIG. 1, the optical deflector 50a includes the first element substrate 20a and a second element substrate 30a which face each other, a homogeneous alignment type liquid crystal layer 40 provided between the first element substrate 20a and the second element substrate 30a, and a sealing material (not shown) provided in a frame pattern for bonding the first element substrate 20a and the second element substrate 30a to each other and sealing the liquid crystal layer 40 between the first element substrate 20a and the second element substrate 30a.

As illustrated in FIGS. 1, 2, 8, 16, and 17, the first element substrate 20a includes a first transparent substrate 10a, a plurality of first signal interconnects 11 extending parallel to each other (in the lateral direction in FIG. 2 and in the longitudinal direction in FIG. 8) on the first transparent substrate 10a, a first interlayer insulating layer 12a covering the first signal interconnects 11, a plurality of first metal layer 13 extend parallel to each other (in an oblique direction in FIG. 2 and in the lateral direction in FIG. 8) on the first interlayer insulating layer 12a, a second interlayer insulating layer 14a which is provided on the first interlayer insulating layer 12a and in which a plurality of groove S extend parallel to each other (in the oblique direction in FIG. 2 and in the lateral direction in FIG. 8), a plurality of first transparent electrodes 16 each of which is provided at a bottom B of an associated one of the grooves S and which extend parallel to each other (in the oblique direction in FIG. 2 and in the lateral direction in FIG. 8), a planarizing layer 17 covering the first transparent electrodes 16 and filling the grooves S, that is, covering an interlayer insulating layer 15a including the first interlayer insulating layer 12a and the second interlayer insulating layer 14a, and an alignment layer (not shown) covering the planarizing layer 17.

Figure 8:
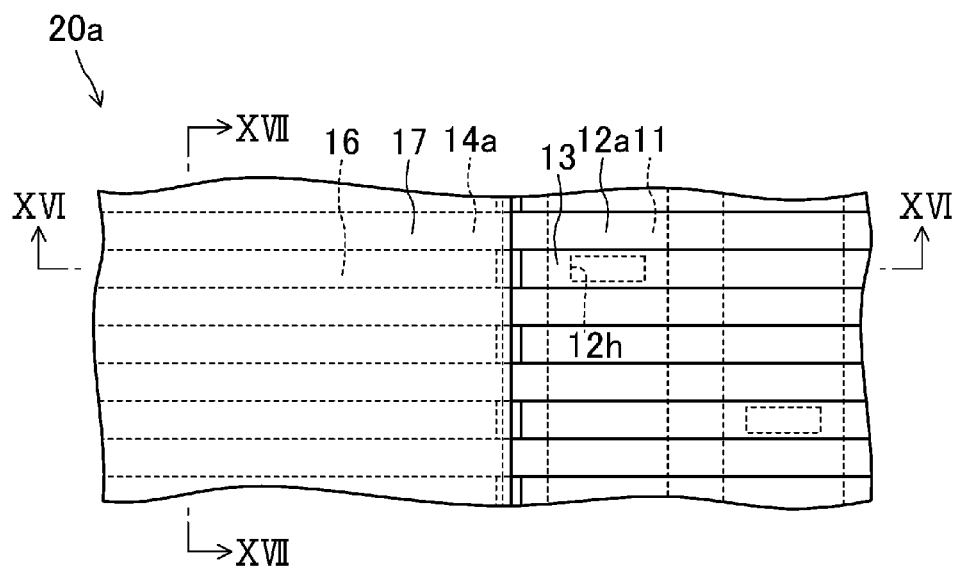
FIG. 8 is a sixth plan view illustrating the method for fabricating the first element substrate according to first embodiment.
Figure 16:
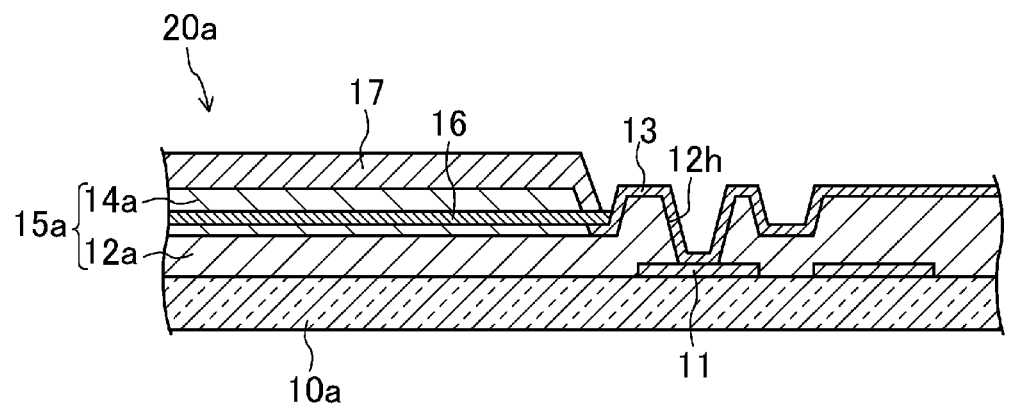
FIG. 16 is a cross-sectional view along the line XVI-XVI of FIG. 8.
Figure 17:
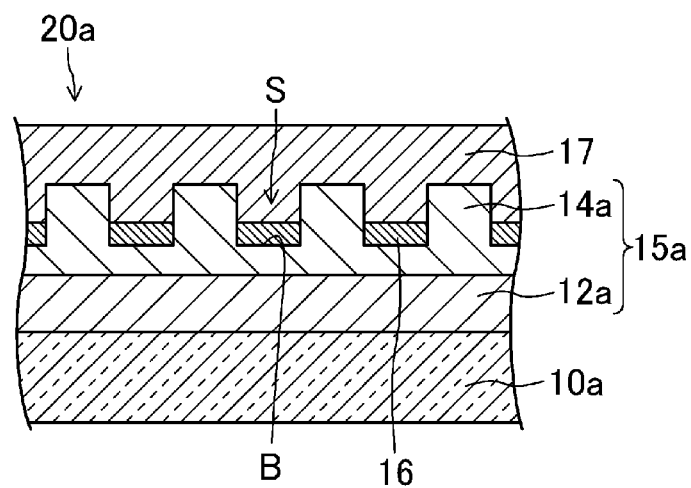
FIG. 17 is a cross-sectional view along the line XVII-XVII of FIG. 8.

As illustrated in FIGS. 8 and 16, each of the first signal interconnects 11 of the first element substrate 20a is connected to an associated one of the first metal layers 13 via a corresponding one of contact holes 12h formed in the first interlayer insulating layer 12a. As illustrated in FIGS. 2, 8, and 16, each of the first transparent electrodes 16 of the first element substrate 20a is stacked at an end of an associated one of the first metal layers 13 so as to be in connected to the associated first metal layer 13. Here, each of the first transparent electrodes 16 is connected to a drive circuit (not shown) mounted on the first element substrate 20a via a corresponding one of the first metal layers 13 and a corresponding one of the first signal interconnects 11.

The refractive index of the planarizing layer 17 matches the refractive index of the second interlayer insulating layer 14a within the range of about ±0.1.

As illustrated in FIG. 1, the second element substrate 30a includes a second transparent substrate 10b, a second transparent electrode 21 provided on the second transparent substrate 10b, and an alignment layer (not shown) covering the second transparent electrode 21.

Here, in the optical deflector 50a, as illustrated in FIG. 1, the second transparent electrode 21 of the second element substrate 30a faces the planarizing layer 17 of the first element substrate 20a.

The liquid crystal layer 40 is made of, for example, a nematic liquid crystal material having electro-optic characteristics, whose dielectric constant anisotropy is positive. Electrically-controlled birefringence (ECB), optically compensated bend (OCB), in-plane-switching (IPS), or the like is used as a liquid crystal mode.

Figure 9:
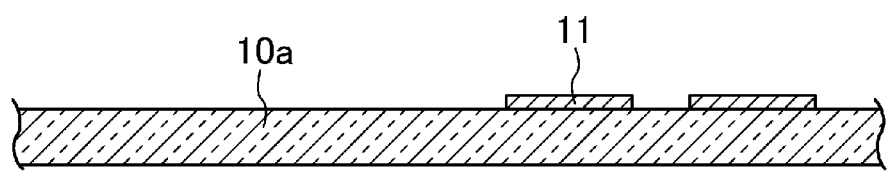
FIG. 9 is a cross-sectional view along the line IX-IX of FIG. 3.
Figure 10:
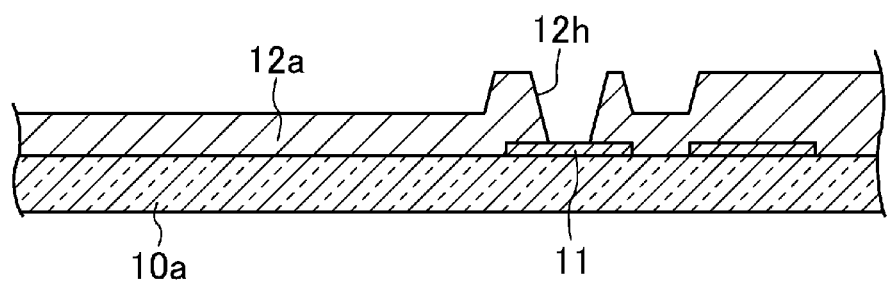
FIG. 10 is a cross-sectional view along the line X-X of FIG. 4.
Figure 11:
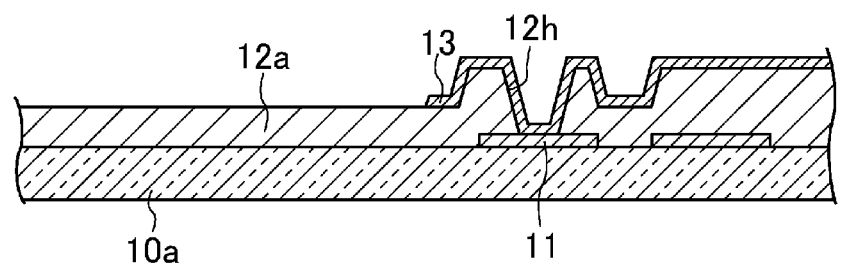
FIG. 11 is a cross-sectional view along the line XI-XI of FIG. 5.
Figure 12:
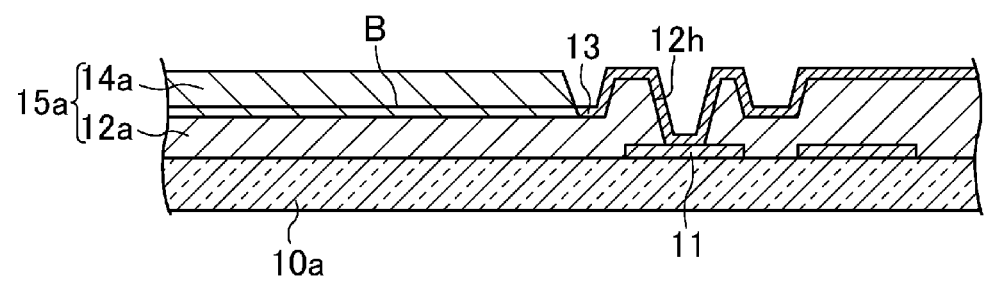
FIG. 12 is a cross-sectional view along the line XII-XII of FIG. 6.
Figure 13:
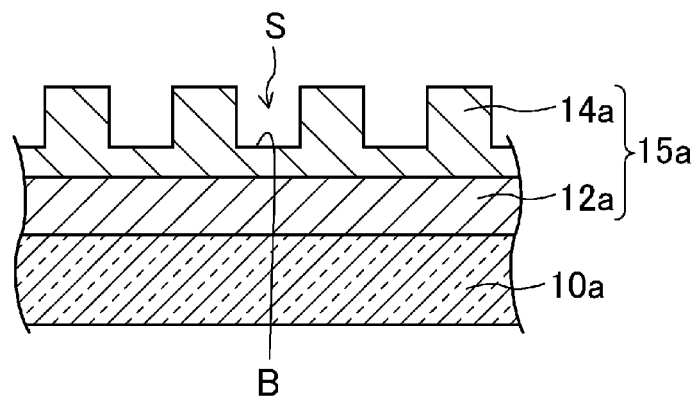
FIG. 13 is a cross-sectional view along the line XIII-XIII of FIG. 6.
Figure 14:
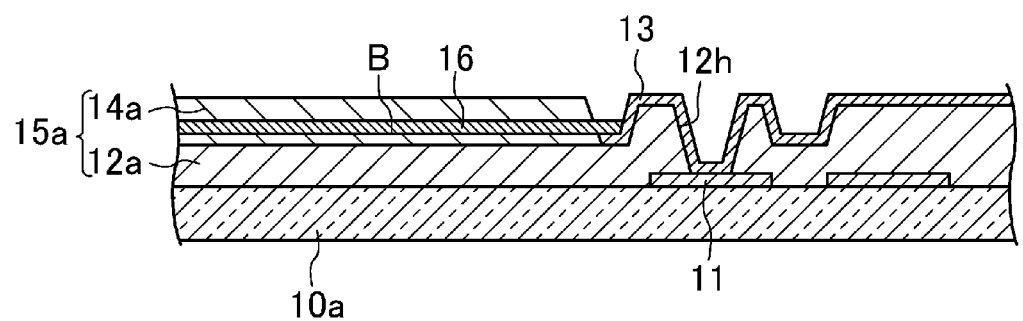
FIG. 14 is a cross-sectional view along the line XIV-XIV of FIG. 7.
Figure 15:
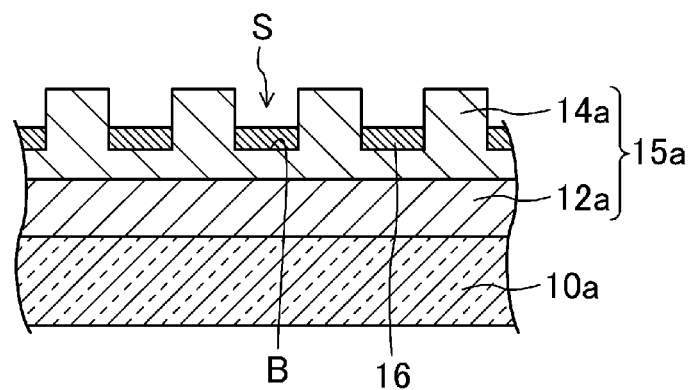
FIG. 15 is a cross-sectional view along the line XV-XV of FIG. 7.

Next, a method for fabricating the optical deflector 50a of the present embodiment will be described. The method for fabricating the optical deflector 50a of the present embodiment includes a first element substrate fabrication step, a second element substrate fabrication step, and a liquid crystal injection step. In the present embodiment, the first element substrate fabrication step will be mainly described with reference to FIGS. 3-17. Here, FIGS. 3-8 are first to sixth plan views illustrating a method for fabricating the first element substrate 20a. FIG. 9 is a cross-sectional view along the line IX-IX of FIG. 3. FIG. 10 is a cross-sectional view along the line X-X of FIG. 4. FIG. 11 is a cross-sectional view along the line XI-XI of FIG. 5. FIG. 12 is a cross-sectional view along the line XII-XII of FIG. 6. FIG. 13 is a cross-sectional view along the line XIII-XIII of FIG. 6. FIG. 14 is a cross-sectional view along the line XIV-XIV of FIG. 7. FIG. 15 is a cross-sectional view along the line XV-XV of FIG. 7.

<First Element Substrate Fabrication Step>

Figure 3:
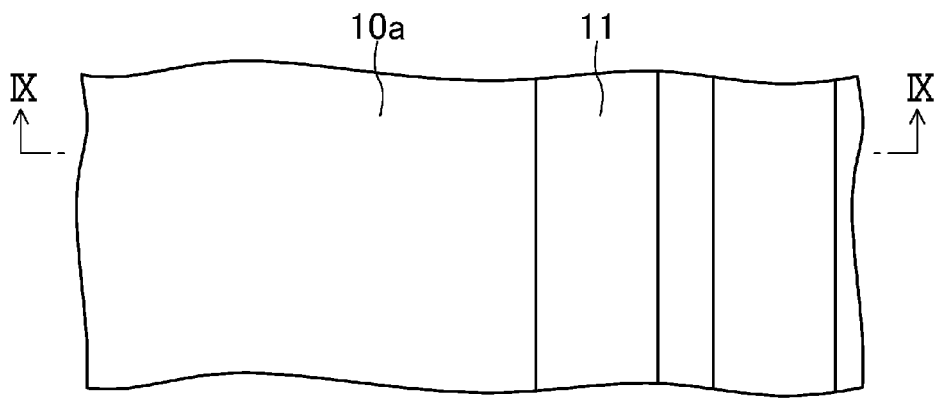
FIG. 3 is a first plan view illustrating a method for fabricating the first element substrate according to the first embodiment.

First, on the entire first transparent substrate 10a such as a glass substrate, a metal film such as a titanium film is formed by, for example, sputtering to have a thickness of about 50-500 nm. Then, photolithography, dry etching, and resist removal and cleaning are performed with respect to the metal film, thereby forming the first signal interconnects 11 as illustrated in FIGS. 3 and 9.

Figure 4:
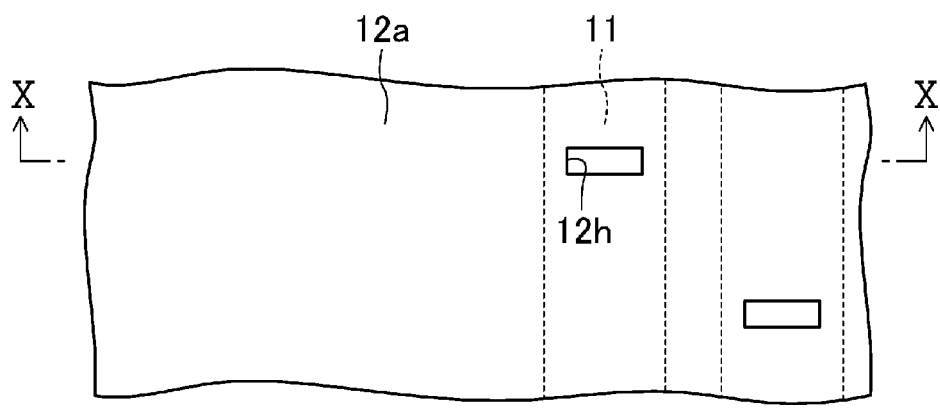
FIG. 4 is a second plan view illustrating the method for fabricating the first element substrate according to first embodiment.

Subsequently, on the entire substrate on which the first signal interconnects 11 have been formed, an inorganic insulating film such as a silicon oxide film is formed by, for example, plasma chemical vapor deposition (CVD) to have a thickness of about 100-1000 nm. Then, photolithography, dry etching, and resist removal and cleaning are performed with respect to the inorganic insulating film, thereby forming the first interlayer insulating layer 12a in which the contact holes 12h are formed as illustrated in FIGS. 4 and 10.

Figure 5:
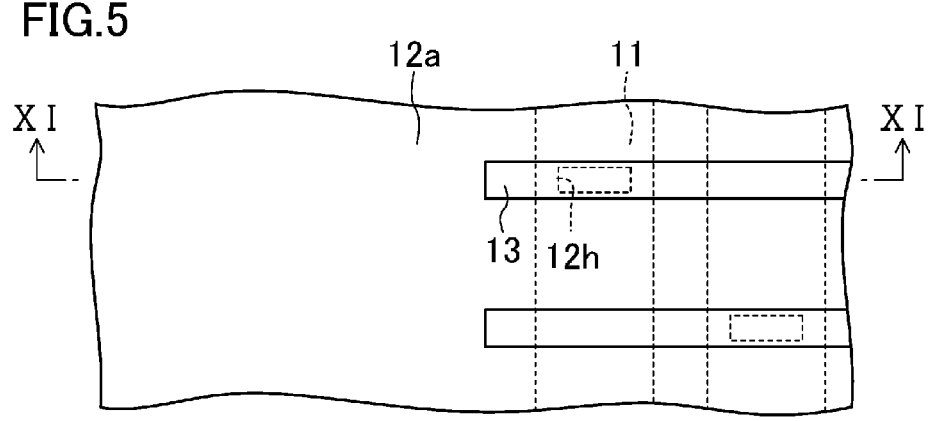
FIG. 5 is a third plan view illustrating the method for fabricating the first element substrate according to first embodiment.

Then, on the entire substrate on which the first interlayer insulating layer 12a has been formed, a metal film such as a molybdenum film is formed by, for example, sputtering to have a thickness of about 50-500 nm. Then, photolithography, dry or wet etching, and resist removal and cleaning are performed with respect to the metal film, thereby forming the first metal layers 13 as illustrated in FIGS. 5 and 11.

Figure 6:
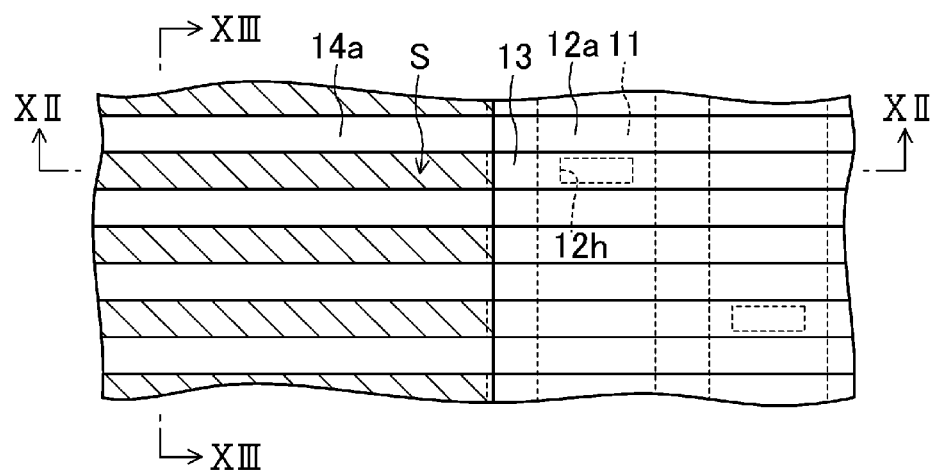
FIG. 6 is a fourth plan view illustrating the method for fabricating the first element substrate according to first embodiment.

Further, on the substrate on which the first metal layers 13 have been formed, an inorganic insulating film (refractive index: about 1.45) such as silicon oxide film is formed by, for example, plasma CVD, to have a thickness of about 100-1000 nm. Then, photolithograph, dry etching, and resist removal and cleaning are performed with respect to the inorganic insulating film, thereby forming the second interlayer insulating layer 14a in which the grooves S are formed as illustrated in FIGS. 6, 12, and 13, so that the interlayer insulating layer 15a is formed. Here, each groove S has, for example, a width of about 1.0 μm, a pitch of about 2.0 μm, and a depth of about 100-1000 nm. In the plan view of FIG. 6, hatched areas represent the grooves S.

Figure 7:
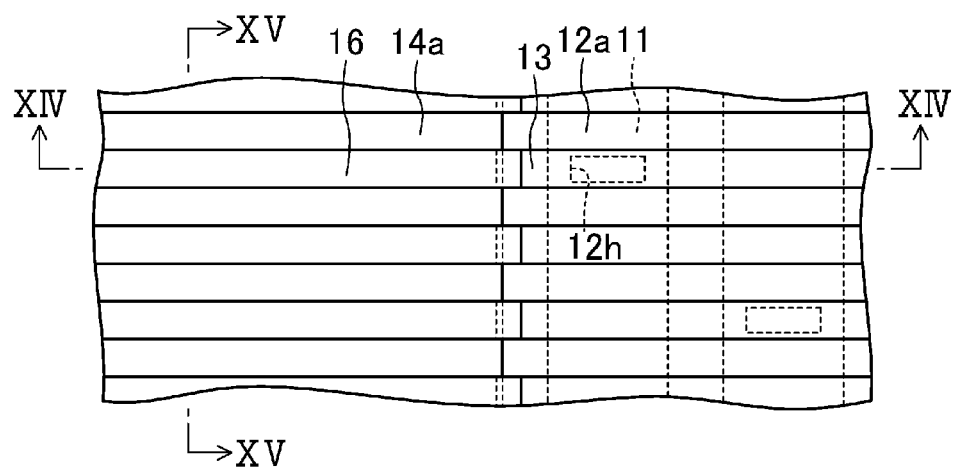
FIG. 7 is a fifth plan view illustrating the method for fabricating the first element substrate according to first embodiment.

Subsequently, on the entire substrate on which the interlayer insulating layer 15a has been formed, a transparent conductive film such as an indium zinc oxide (IZO) film is formed by, for example, sputtering to have a thickness of about 100-150 nm. Then, photolithography, wet etching, and resist removal and cleaning are performed with respect to the transparent conductive film, thereby forming the first transparent electrodes 16 as illustrated in FIGS. 7, 14, and 15.

Further, on the entire substrate on which the first transparent electrodes 16 have been formed, a photosensitive acrylic resin material (refractive index: about 1.49) is coated by, for example, spin coating or slit coating to have a thickness of about 1 μm. Then, exposure, developing, and baking are performed with respect to the coating film, thereby forming the planarizing layer 17 as illustrated in FIGS. 8, 16, and 17. In the present embodiment, a method in which the planarizing layer 17 is made of an acrylic resin material has been described. However, the planarizing layer 17 may be made of the same material (for example, silicon oxide film) as the second interlayer insulating layer 14a so that the refractive index of the planarizing layer 17 is exactly equal to the refractive index of the second interlayer insulating layer 14a.

Finally, on the entire substrate on which the planarizing layer 17 has been formed, a resin film made of polyimide is coated by, for example, printing. Then, baking and rubbing treatments are performed with respect to the coating film, thereby forming the alignment layer.

In this way, the first element substrate 20a can be fabricated.

<Second Element Substrate Fabrication Step>

First, on the entire second transparent substrate 10b such as a glass substrate, a transparent conductive film such as an IZO film is formed by, for example, sputtering to have a thickness of about 100-150 nm, thereby forming the second transparent electrode 21.

Subsequently, on the entire substrate on which the second transparent electrode 21 has been formed, a resin film made of polyimide is coated by, for example, printing method. Then, baking and rubbing treatments are performed with respect to the coating film, thereby forming the alignment layer.

In this way, the second element substrate 30a can be fabricated.

<Liquid Crystal Injection Step>

First, for example, on a surface of the second element substrate 30a fabricated in the second element substrate fabrication step, a sealing material made of, for example, ultraviolet (UV) curable thermosetting resin is printed in the shape of a frame. Then, a liquid crystal material is dropped in a region surrounded by the frame made of the sealing material.

Subsequently, the second element substrate 30a on which the liquid crystal material has been dropped and the first element substrate 20a fabricated in the first element substrate fabrication step are bonded to each other under reduced pressure to form a bonded structure. Then, the bonded structure is placed under atmospheric pressure, thereby pressurizing a surface and a back face of the bonded structure.

Further, the sealing material held by the bonded structure is irradiated with UV light. Then, the bonded structure is heated, thereby curing the sealing material.

In this way, the optical deflector 50a of the present embodiment can be fabricated.

Figure 18:
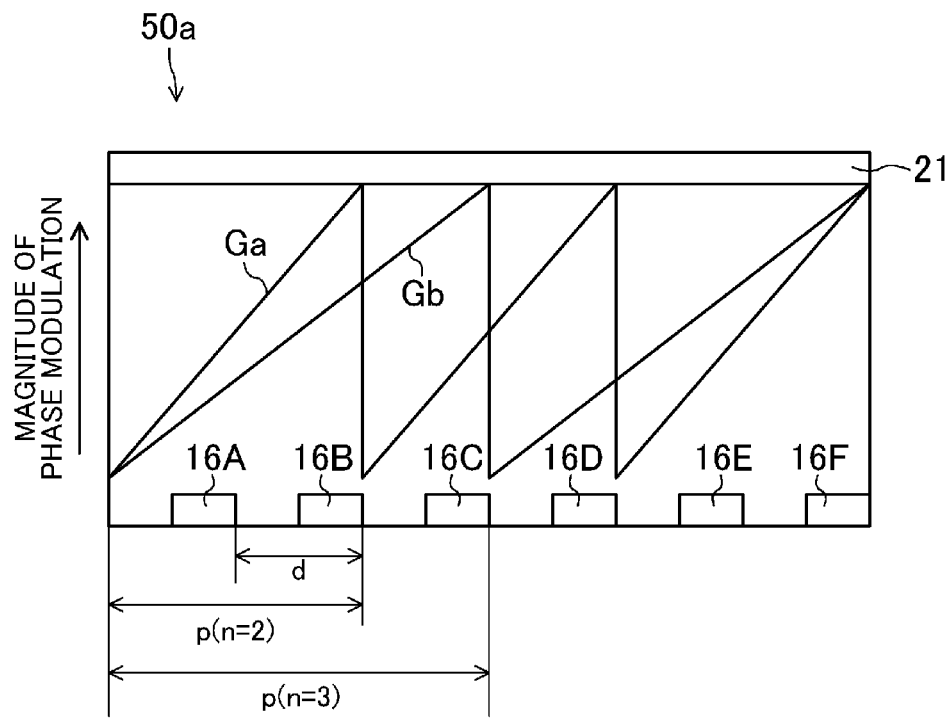
FIG. 18 is a view illustrating a pattern of a diffraction grating of the optical deflector according to the first embodiment.
Figure 19:
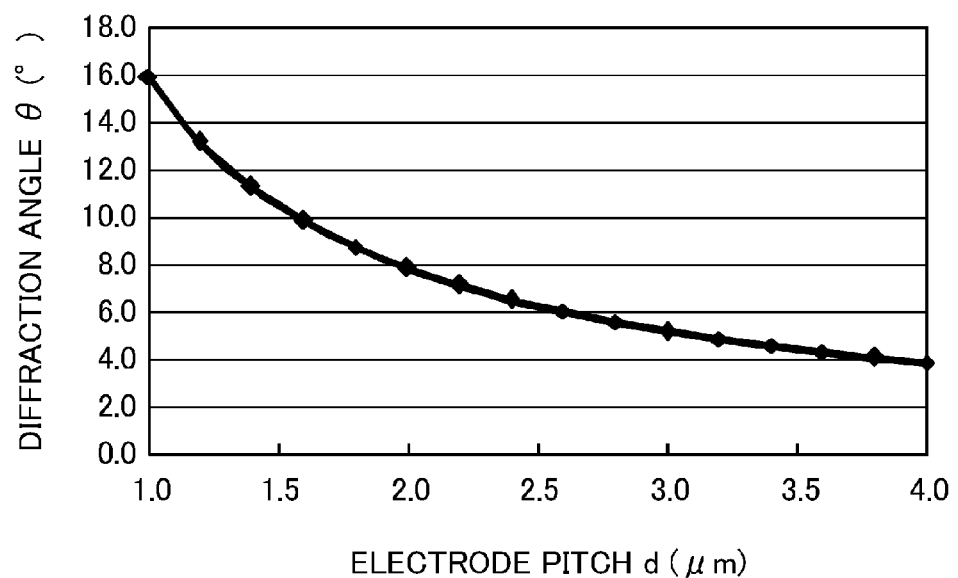
FIG. 19 is a graph illustrating the relationship between the electrode pitch and the diffraction angle of the optical deflector according to the first embodiment.

Next, operation of the optical deflector 50a of the present embodiment will be described with reference to FIGS. 18 and 19. Here, FIG. 18 is a schematic view illustrating the optical deflector 50a in a simplified manner and patterns of diffraction gratings Ga and Gb of the optical deflector 50a. FIG. 19 is a graph illustrating the relationship between the electrode pitch d and the diffraction angle 8 of the optical deflector 50a.

As illustrated in FIG. 18, in the optical deflector 50a, a signal voltage of 0 V is applied to a first transparent electrode 16A, a first transparent electrode 16C, a first transparent electrode 16E, and a second transparent electrode 21, and a signal voltage of 5 V is applied to a first transparent electrode 16B, a first transparent electrode 16D, and a first transparent electrode 16F, thereby inducing a spatial refractive index modulation region in the liquid crystal layer 40 to form a blazed diffraction grating Ga in the liquid crystal layer 40. As illustrated in FIG. 18, in the optical deflector 50a, the grating pitch p (n=2) of the diffraction grating Ga is 2d which is two times the electrode pitch d.

As illustrated in FIG. 19, the diffraction angle θ of the diffraction grating Ga is increased as the electrode pitch d of the first transparent electrodes 16 is reduced based on the relational expression $\theta=\sin^{-1}(\lambda/p)=\sin^{-1}(\lambda/(n \times d))$. In the graph of FIG. 19, a laser beam having a wavelength λ of 550 nm is used. Here, in order to allow a laser beam having a wavelength of, for example, 550 nm to enter the optical deflector 50a to output light at a diffraction angle of greater than or equal to 15°, the electrode pitch d of the first transparent electrodes 16 has to be less than or equal to 1.0 μm.

As illustrated in FIG. 18, in the optical deflector 50a, a signal voltage of 0 V is applied to the first transparent electrode 16A, the first transparent electrode 16D, and the second transparent electrode 21, a signal voltage of 2.5 V is applied to the first transparent electrode 16B and the first transparent electrode 16E, and a signal voltage of 5 V is applied to the first transparent electrode 16C and the first transparent electrode 16F, thereby inducing a spatial refractive index modulation region in the liquid crystal layer 40 to form a blazed diffraction grating Gb in the liquid crystal layer 40. Here, the grating pitch p (n=3) of the diffraction grating Gb is 3d which is three times the electrode pitch d as illustrated in FIG. 18.

As described above, in the optical deflector 50a of the present embodiment, the grooves S (recessed lines) extend parallel to each other at a surface of the interlayer insulating layer 15a of the first element substrate 20a opposite to the first transparent substrate 10a, and each of the first transparent electrodes 16 is provided at a bottom B of an associated one of the grooves S, so that each of projection lines corresponding to the recessed lines of the interlayer insulating layer 15a is disposed between an associated pair of the first transparent electrodes 16 adjacent to each other, which can physically reduce short circuits between the first transparent electrodes 16. The interlayer insulating layer 15a has a physical periodic structure due to the grooves S extending parallel to each other. However, the planarizing layer 17 having a refractive index equal to the refractive index of the interlayer insulating layer 15a (at least the second interlayer insulating layer 14a) fills the grooves S with the first transparent electrode 16 being provided at the bottom B of each groove S. Therefore, the interlayer insulating layer 15a has no optical periodic structure. Therefore, when a predetermined signal voltage is applied to each of the first transparent electrodes 16 of the first element substrate 20a and the second transparent electrode 21 of the second element substrate 30a to operate the optical deflector 50a to form the blazed diffraction gratings Ga and Gb in the liquid crystal layer 40, control of the diffraction angle of incident light from the first transparent substrate 10a of the first element substrate 20a (or the second transparent substrate 10b of the second element substrate 30a) is ensured. Thus, unnecessary diffracted light is not likely to be included in light output from the second transparent substrate 10b of the second element substrate 30a (or the first transparent substrate 10a of the first element substrate 20a). Therefore, short circuits between the transparent electrodes are reduced, and unnecessary diffracted light during operation can be reduced.

In the optical deflector 50a of the present embodiment, the first metal layers 13 are provided on a region of the first interlayer insulating layer 12a exposed from the second interlayer insulating layer 14a of the first element substrate 20a. Therefore, even if there is a residue of a metal film for forming the first metal layers 13 on the first interlayer insulating layer 12a, the second interlayer insulating layer 14a is formed after the formation of the first metal layers 13. Thus, between the first transparent electrodes 16 provided on the second interlayer insulating layer 14a, it is possible to reduce short circuits caused due to the residue of the metal film for forming the first metal layers 13.

In the optical deflector 50a of the present embodiment, the planarizing layer 17 of the first element substrate 20a covers the interlayer insulating layer 15a. Thus, it is possible to ensure filling the grooves S in the interlayer insulating layer 15a with the planarizing layer 17.

<Second Embodiment of the Invention>

Figure 20:
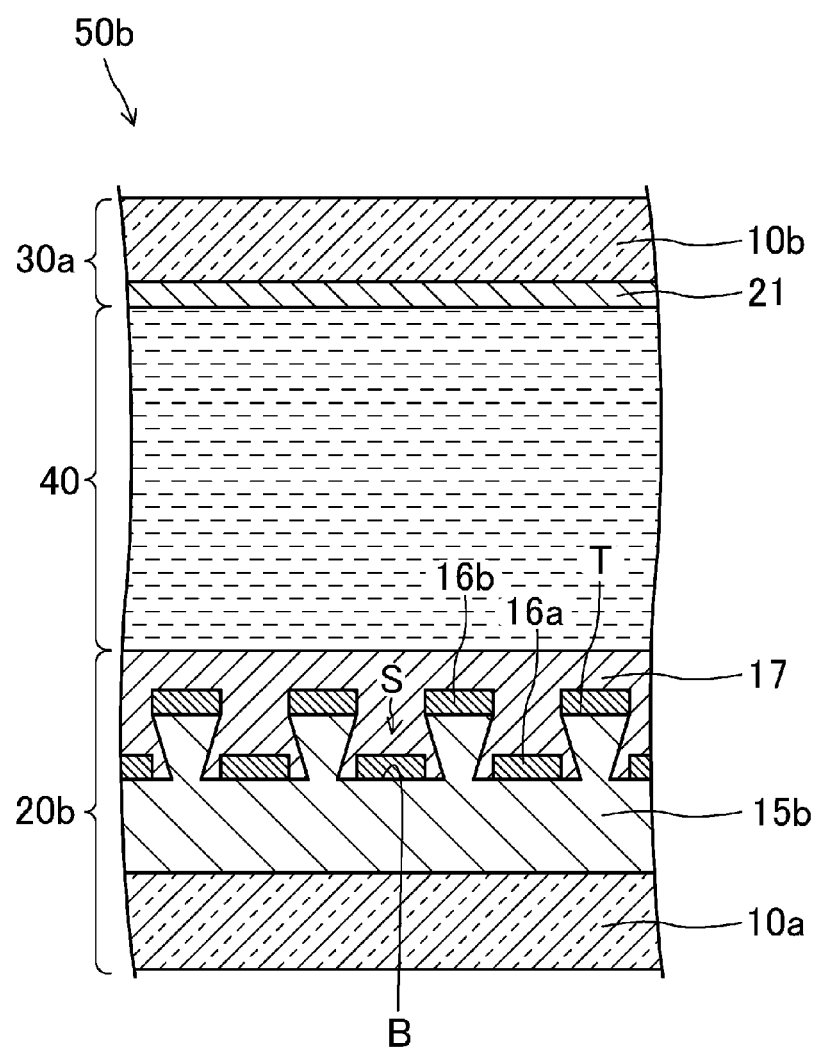
FIG. 20 is a cross-sectional view illustrating an optical deflector according to a second embodiment.
Figure 21:
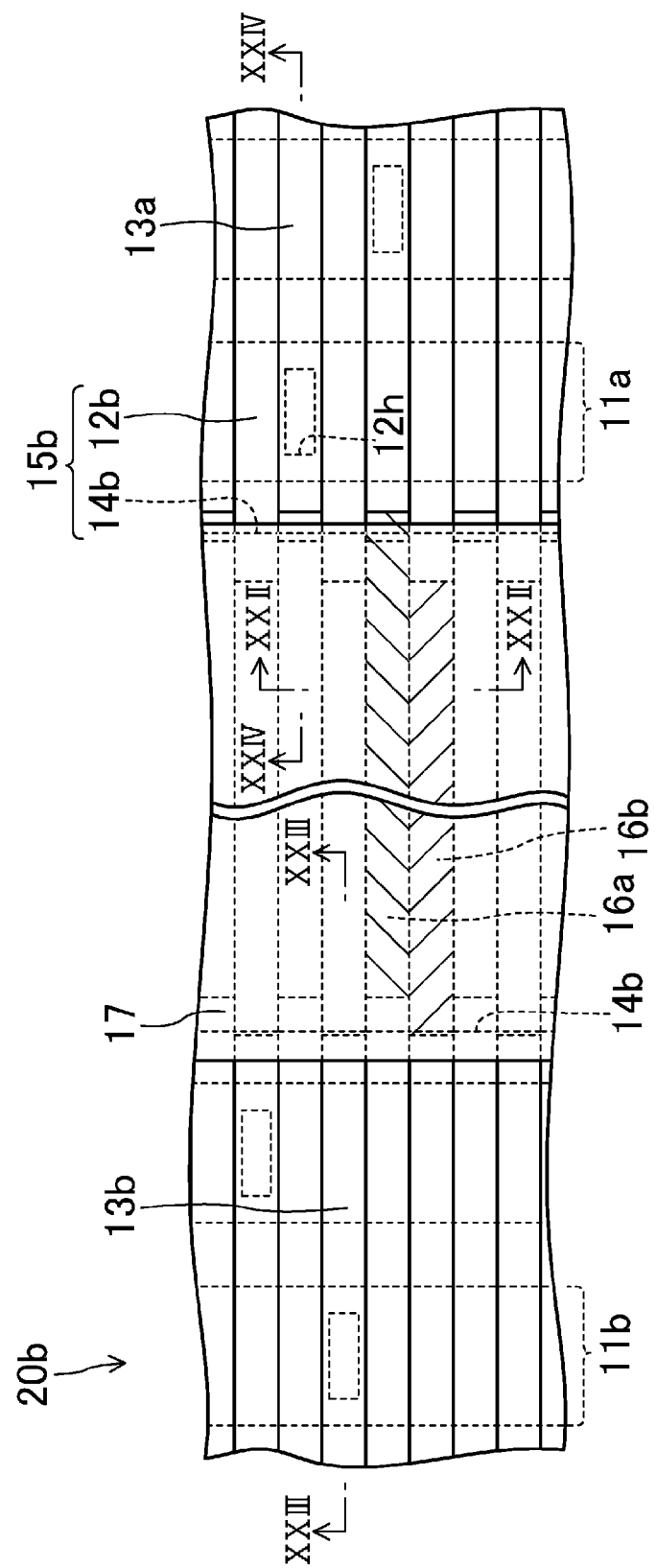
FIG. 21 is a plan view illustrating a first element substrate included in the optical deflector according to the second embodiment.
Figure 22:
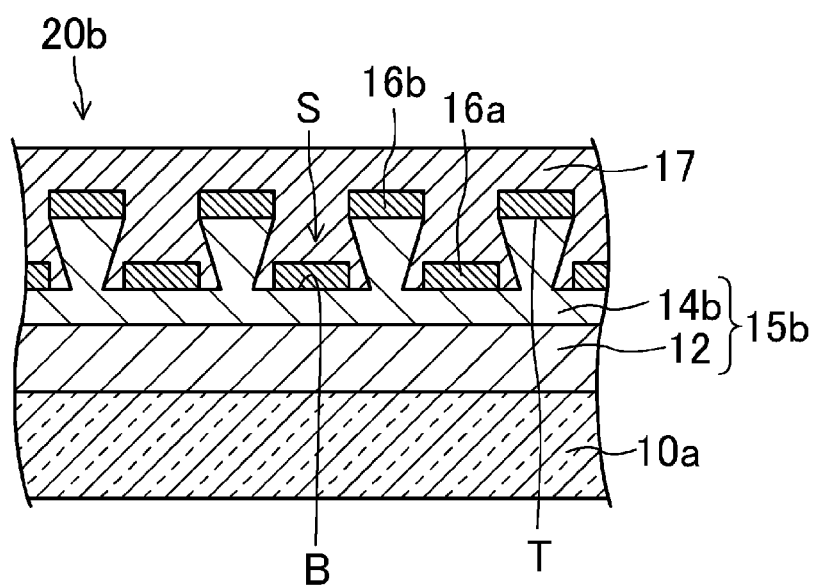
FIG. 22 is a cross-sectional view illustrating the first element substrate along the line XXII-XXII of FIG. 21.
Figure 23:
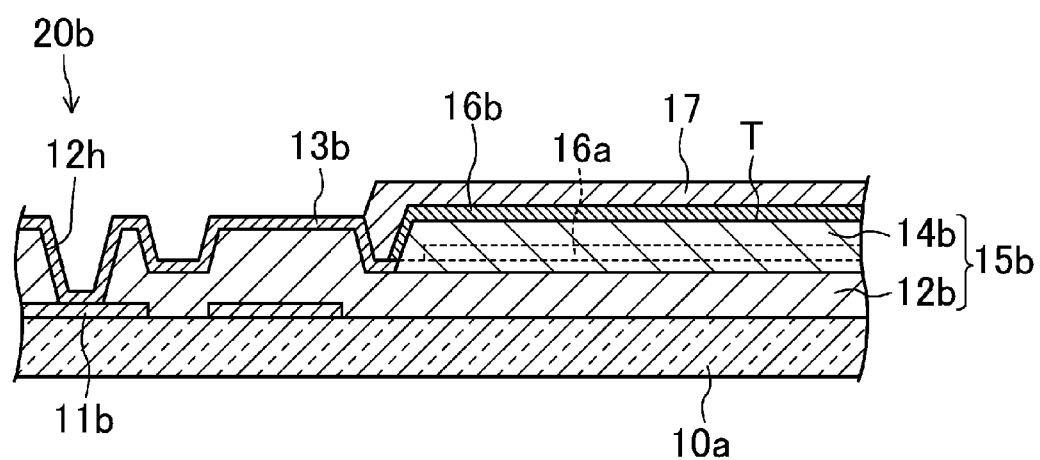
FIG. 23 is a cross-sectional view illustrating the first element substrate along the line XXIII-XXIII of FIG. 21.
Figure 24:
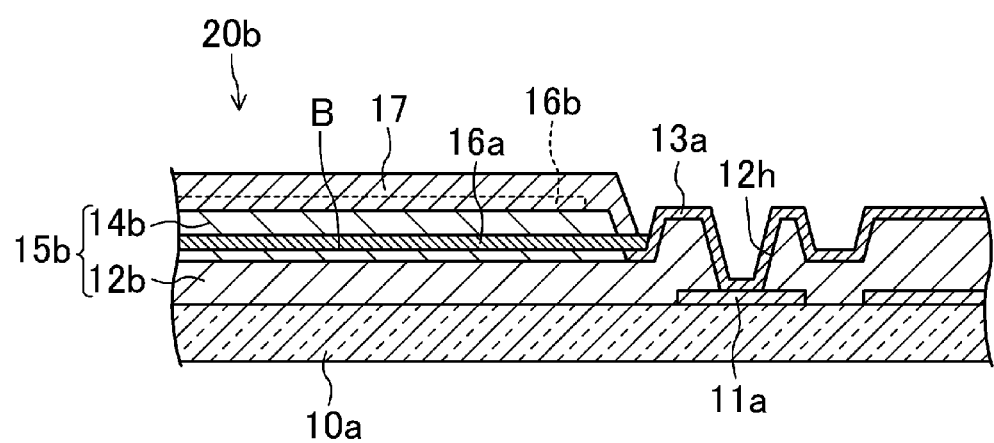
FIG. 24 is a cross-sectional view illustrating the first element substrate along the line XXIV-XXIV of FIG. 21.
Figure 25:
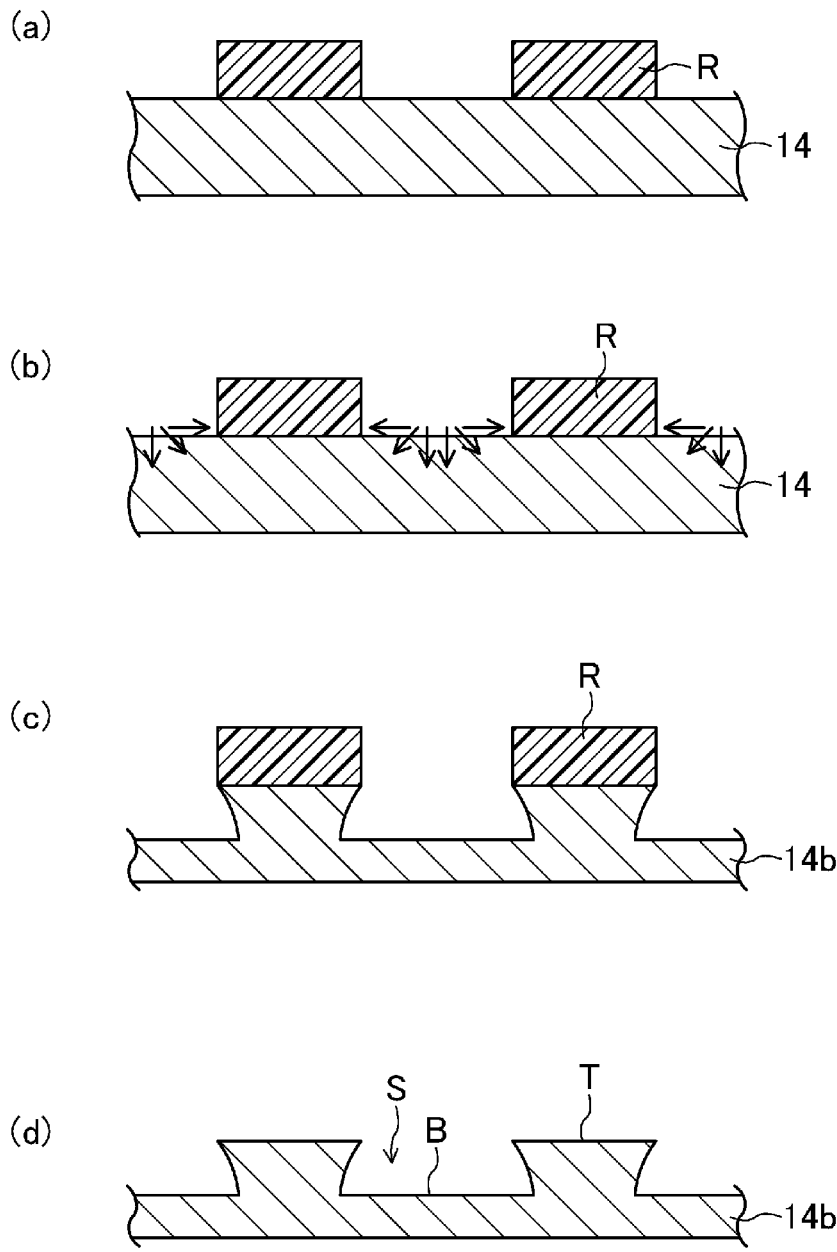
FIG. 25 is a cross-sectional view illustrating a method for fabricating an interlayer insulating layer included in the first element substrate according to the second embodiment.

FIGS. 20-27 illustrate a second embodiment of an optical deflector according to the present invention. Specifically, FIG. 20 is a cross-sectional view illustrating an optical deflector 50b of the present embodiment. FIG. 21 is a plan view illustrating a first element substrate 20b included in the optical deflector 50b. FIGS. 22, 23, and 24 are cross-sectional views illustrating the first element substrate 20b respectively along the line XXII-XXII, the line XXIII-XXIII, and the line XXIV-XXIV of FIG. 21. FIG. 25 is a cross-sectional view illustrating a method for fabricating forming a second interlayer insulating layer 14b included in the first element substrate 20b. In the following embodiment, the same reference numerals as those shown in FIGS. 1-19 are used to represent equivalent elements, and the detailed explanation thereof will be omitted.

The first embodiment has described the optical deflector 50a in which each of the first transparent electrodes 16 is provided at the bottom B of an associated one of the grooves S in the interlayer insulating layer 15a. However, the present embodiment will describe the optical deflector 50b in which each of first transparent electrodes 16a is provided at a bottom B of an associated one of grooves S in an interlayer insulating layer 15b, and each of third transparent electrodes 16b is provided on a corresponding one of top potions T of the interlayer insulating layer 15b.

As illustrated in FIG. 20, the optical deflector 50b includes the first element substrate 20b and a second element substrate 30a which face each other, a homogeneous alignment type liquid crystal layer 40 provided between the first element substrate 20b and the second element substrate 30a, and a sealing material (not shown) provided in a frame pattern for bonding the first element substrate 20b and the second element substrate 30a to each other and sealing the liquid crystal layer 40 between the first element substrate 20b and the second element substrate 30a.

As illustrated in FIGS. 20-24, the first element substrate 20b includes a first transparent substrate 10a, a plurality of right first signal interconnects 11a extending parallel to each other (in the longitudinal direction in FIG. 21) on the first transparent substrate 10a, a plurality of left first signal interconnects 11b extending parallel to each other (in the longitudinal direction in FIG. 21) on the first transparent substrate 10a, a first interlayer insulating layer 12b covering the right first signal interconnects 11a and left first signal interconnects 11b, a plurality of right first metal layers 13a extending parallel to each other (in the lateral direction in FIG. 21) on the first interlayer insulating layer 12b, a plurality of left first metal layers 13b extending parallel to each other (in the lateral direction in FIG. 21) on the first interlayer insulating layer 12b, a second interlayer insulating layer 14b which is provided on the first interlayer insulating layer 12b and in which the grooves S extend parallel to each other (in the lateral direction in FIG. 21), the first transparent electrodes 16a each of which is provided at a bottom B of an associated one of the grooves S and which extend parallel to each other (in the lateral direction in FIG. 21), the plurality of third transparent electrodes 16b each of which is provided on an associated one of the top portions T of the second interlayer insulating layer 14b and which extend parallel to each other (in the lateral direction in FIG. 21), a planarizing layer 17 covering the first transparent electrodes 16a and the third transparent electrodes 16b and filling the grooves S, and an alignment layer (not shown) covering the planarizing layer 17. In the plan view of FIG. 21, one of the first transparent electrodes 16a and one of the third transparent electrodes 16b are hatched so that the contour of the first transparent electrodes 16a and the contour of the third transparent electrodes 16b can be easily seen.

As illustrated in FIGS. 21 and 24, each of the right first signal interconnects 11a of the first element substrate 20b is connected to an associated one of the right first metal layers 13a via a corresponding one of contact holes 12h formed in the first interlayer insulating layer 12b, and each of the first transparent electrodes 16a is stacked at an end of an associated one of the right first metal layers 13a so as to be connected to the associated right first metal layer 13a. Here, each of the first transparent electrodes 16a is connected to a drive circuit (not shown) mounted on the first element substrate 20b via a corresponding one of the right first metal layers 13a and a corresponding one of the right first signal interconnects 11a.

As illustrated in FIGS. 21 and 23, each of the left first signal interconnects 11b of the first element substrate 20b is connected to an associated one of the left first metal layers 13b via a corresponding one of the contact holes 12h formed in the first interlayer insulating layer 12b, and each of the third transparent electrodes 16b is stacked at an end of an associated one of the left first metal layers 13b so as to be connected to the associated left first metal layer 13b. Here, each of the third transparent electrodes 16b is connected to the drive circuit (not shown) mounted on the first element substrate 20b via a corresponding one of the left first metal layers 13b and a corresponding one of the left first signal interconnects 11b.

The refractive index of the planarizing layer 17 matches the refractive index of the second interlayer insulating layer 14b within the range of about ±0.1.

The first element substrate 20b of the present embodiment can be fabricated as follows. When the second interlayer insulating layer 14a and the first transparent electrodes 16 are formed in the first element substrate fabrication step of the first embodiment, an inorganic insulating film 14 such as a silicon oxide film is first formed by, for example, plasma CVD. Subsequently, photolithography is performed to form a resist R on the inorganic insulating film 14 as illustrated in FIG. 25(a). Then, as illustrated in FIGS. 25(b) and 25(c), the inorganic insulating film 14 is isotropically dry etched by using an isotropic plasma etching system. Further, as illustrated in FIG. 25(d), the resist R is removed and cleaned off, thereby forming the second interlayer insulating layer 14b. Subsequently, on the entire substrate on which the second interlayer insulating layer 14b has been formed, a transparent conductive film such as an IZO film is formed by, for example, sputtering, thereby forming the first transparent electrodes 16a and the third transparent electrodes 16b.

Figure 26:
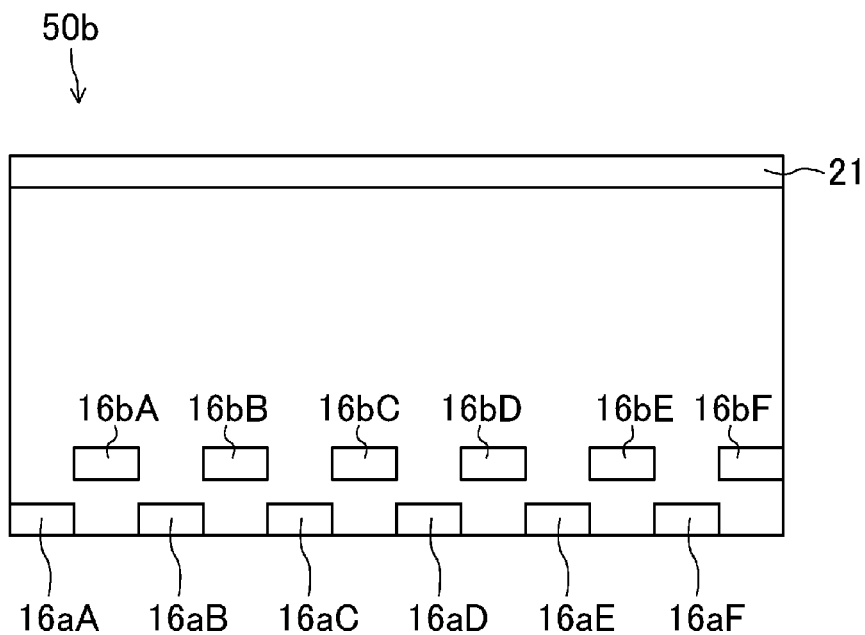
FIG. 26 is a schematic view illustrating the optical deflector according to the second embodiment in a simplified manner.
Figure 27:
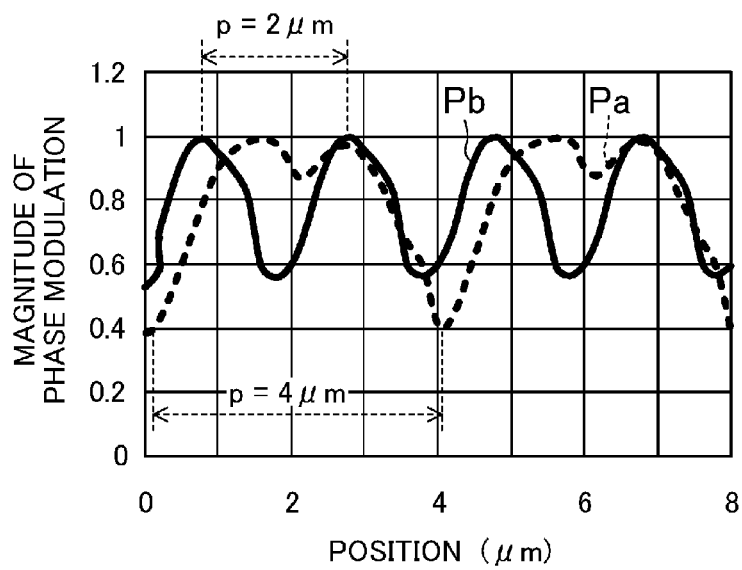
FIG. 27 is a graph illustrating the magnitude of phase modulation of the optical deflector according to the second embodiment.

Next, operation of the optical deflector 50b of the present embodiment will be described with reference to FIGS. 26 and 27. Here, FIG. 26 is a schematic view illustrating the optical deflector 50b in a simplified manner, wherein the transparent electrodes are selectively shown. FIG. 27 is a graph illustrating the magnitude of phase modulation of the optical deflector 50b. In FIG. 27, the magnitude of phase modulation along the vertical axis is in relative value of the magnitude of phase modulation normalized by using the maximum value as 1.

As illustrated in FIG. 26, in the optical deflector 50b, a signal voltage of 0 V is applied to first transparent electrodes 16aA-16aF and a second transparent electrode 21, and a signal voltage of 5 V is applied to third transparent electrodes 16bA-16bF, thereby inducing a spatial refractive index modulation region in the liquid crystal layer 40 to form a blazed diffraction grating in the liquid crystal layer 40.

In the optical deflector 50b, as shown by the curve Pb in FIG. 27, the grating pitch p (n=2) is about 2 μm, and the diffraction angle $\theta(=\sin^{-1}(\lambda/p)=\sin^{-1}(550 \text{ nm}/2.0 \text{ μm}))$ is 15.96°. In contrast, in the optical deflector 50a of the first embodiment, as shown by the curve Pa in FIG. 27, the grating pitch p (n=2) is about 4 μm, and the diffraction angle $\theta(=\sin^{-1}(550 \text{ nm}/4.0 \text{ μm}))$ is 7.90°.

As described above, in the optical deflector 50b of the present embodiment, the grooves S extend parallel to each other at a surface of the interlayer insulating layer 15b of the first element substrate 20b opposite to the first transparent substrate 10a, each of the first transparent electrodes 16a is provided at the bottom B of an associated one of the grooves S, and each of the third transparent electrodes 16b is provided at an associated one of the top portions T of the interlayer insulating layer 15b, which can physically reduce short circuits between each first transparent electrode 16a and each third transparent electrode 16b. The interlayer insulating layer 15b has a physical periodic structure due to the grooves S extending parallel to each other. However, the planarizing layer 17 having a refractive index equal to the refractive index of the interlayer insulating layer 15b (at least the second interlayer insulating layer 14b) fills the grooves S with the first transparent electrode 16a being provided at the bottom B of each groove S, and the planarizing layer 17 covers the third transparent electrodes 16b on the top portions T outside the grooves S. Therefore, the interlayer insulating layer 15b has no optical periodic structure. Therefore, when a predetermined signal voltage is applied to each of the first transparent electrodes 16a and each of the third transparent electrodes 16b of the first element substrate 20b and the second transparent electrode 21 of the second element substrate 30a to operate the optical deflector 50b to form blazed diffraction gratings in the liquid crystal layer 40, control of the diffraction angle of incident light from the first transparent substrate 10a of the first element substrate 20b (or the second transparent substrate 10b of the second element substrate 30a) is ensured. Thus, unnecessary diffracted light is not likely to be included in light output from the second transparent substrate 10b of the second element substrate 30a (or the first transparent substrate 10a of the first element substrate 20b). Therefore, short circuits between the transparent electrodes are reduced, and unnecessary diffracted light during operation can be reduced.

In the optical deflector 50b of the present embodiment, each of the first transparent electrodes 16a is provided at the bottom of an associated one of the grooves S formed in the interlayer insulating layer 15b, and each of the third transparent electrodes 16b is provided on an associated one of the top portions T of the interlayer insulating layer 15b. Therefore, the first transparent electrodes 16a and the third transparent electrodes 16b are alternately provided in the first element substrate 20b. Therefore, in the first element substrate 20b, the pitch of the transparent electrodes is smaller than in the case where only the first transparent electrodes 16 are arranged, so that the diffraction angle θ can be increased based on the relational expression sin $\theta=\lambda/(n\times d)$.

In the optical deflector 50b of the present embodiment, the first transparent electrodes 16a are extended to one end of the first element substrate 20b, and the third transparent electrodes 16b are extended to the other end of the first element substrate 20b. This means that the first transparent electrodes 16a and the third transparent electrodes 16b are alternately extended to opposite ends in the order of their arrangement on the first element substrate 20b. Therefore, even when the pitch of the transparent electrodes is small, it is possible to ensure the connectivity of the transparent electrodes (the first transparent electrodes 16a and the third transparent electrodes 16b) to the signal interconnects (the right first signal interconnects 11a and the left first signal interconnects 11b) for applying signal voltages to the transparent electrodes.

In the first element substrate 20b of the optical deflector 50b of the present embodiment, each groove S in the interlayer insulating layer 15b is formed to have a so-called reverse tapered shape such that the width of the groove S increases toward the bottom B of the groove S. Therefore, in the first element substrate 20b, the first transparent electrodes 16a can be separated from the third transparent electrodes 16b in a self-aligning manner.

<Third Embodiment of the Invention>

Figure 28:
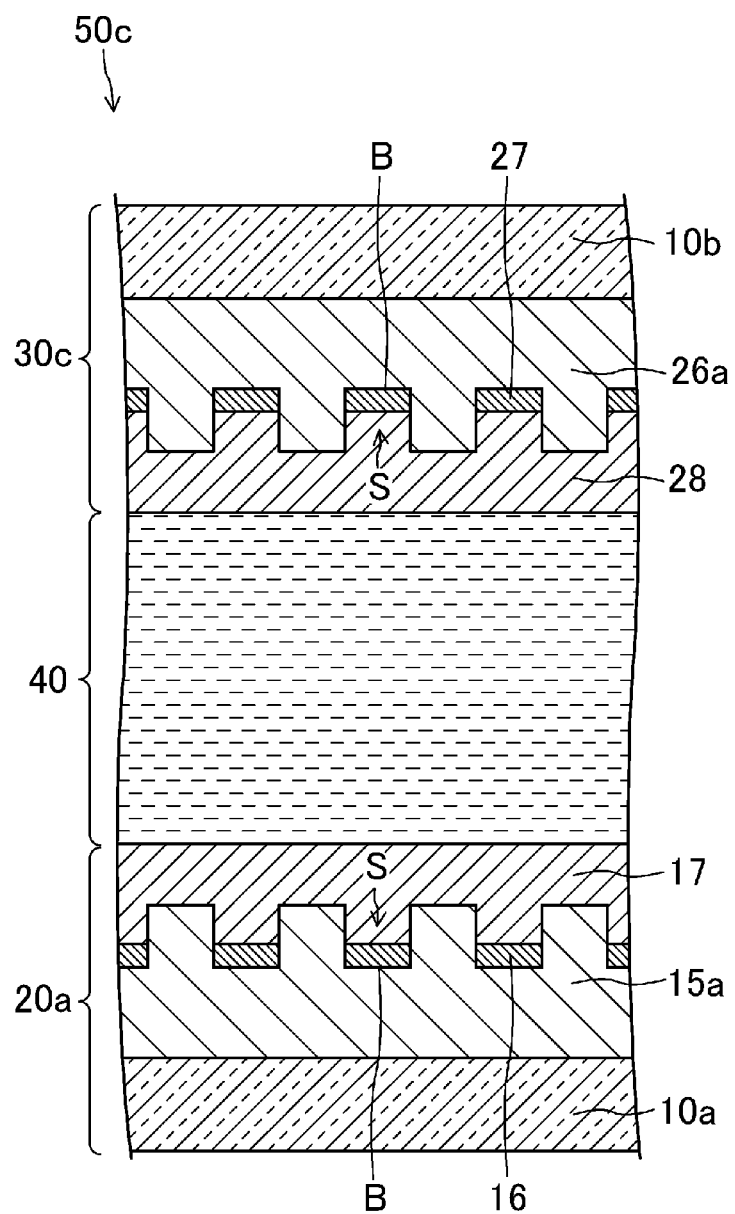
FIG. 28 is a cross-sectional view illustrating an optical deflector according to a third embodiment.
Figure 29:
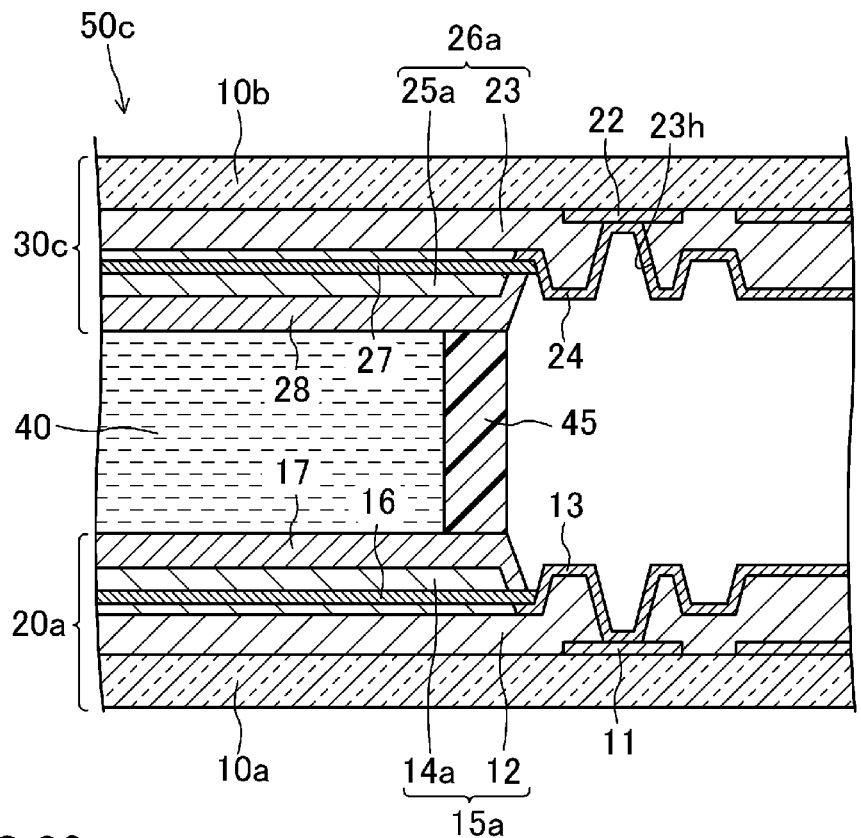
FIG. 29 is another cross-sectional view illustrating the optical deflector according to the third embodiment.

FIGS. 28-31 illustrate a third embodiment of an optical deflector according to the present invention. Specifically, FIG. 28 is a cross-sectional view illustrating an optical deflector 50c of the present embodiment. FIG. 29 is another cross-sectional view illustrating the optical deflector 50c.

The first embodiment and the second embodiment have respectively described the optical deflector 50a and the optical deflector 50b including the second element substrate 30a provided with a single second transparent electrode 21. However, the present embodiment will describe the optical deflector 50c including a second element substrate 30c provided with a plurality of second transparent electrodes 27.

As illustrated in FIG. 28, the optical deflector 50c includes a first element substrate 20a and the second element substrate 30c which face each other, a homogeneous alignment type liquid crystal layer 40 provided between the first element substrate 20a and the second element substrate 30c, and a sealing material (see reference number 45 in FIG. 29) provided in a frame pattern for bonding the first element substrate 20a and the second element substrate 30c to each other and sealing the liquid crystal layer 40 between the first element substrate 20a and the second element substrate 30c.

As illustrated in FIGS. 28 and 29, the second element substrate 30c includes a second transparent substrate 10b, a plurality of second signal interconnects 22 extending parallel to each other on the first transparent substrate 10b, a first interlayer insulating layer 23 covering the second signal interconnects 22, a plurality of second metal layers 24 extending parallel to each other on the first interlayer insulating layer 23, a second interlayer insulating layer 25a which is provided on the first interlayer insulating layer 23 and at an upper surface of which a plurality of grooves S extend parallel to each other, a plurality of second transparent electrodes 27 each of which is provided at a bottom B of an associated one of the grooves S and which extend parallel to each other, a planarizing layer 28 covering the second transparent electrodes 27 and filling the grooves S, that is, covering an interlayer insulating layer 26a including the first interlayer insulating layer 23 and the second interlayer insulating layer 25a, and an alignment layer (not shown) covering the planarizing layer 28.

As illustrated in FIG. 29, each of the first signal interconnects 22 of the second element substrate 30c is connected to an associated one of the second metal layers 24 via a corresponding one of contact holes 23h formed in the first interlayer insulating layer 23, and as illustrated in FIG. 29, each of the second transparent electrodes 27 is stacked at an end of an associated one of the second metal layers 24 so as to be connected to the associated second metal layer 24. Here, each of the second transparent electrodes 27 is connected to a drive circuit (not shown) mounted on, for example, the second element substrate 30c via a corresponding one of the second metal layers 24 and a corresponding one of the first signal interconnects 22.

The refractive index of the planarizing layer 28 matches the refractive index of the second interlayer insulating layer 25a within the range of about ±0.1.

Since the second element substrate 30c of the present embodiment has the substantially the same configuration as the first element substrate 20a of the first embodiment, the second element substrate 30c can be fabricated by performing the first element substrate fabrication step described in the first embodiment.

Figure 30:
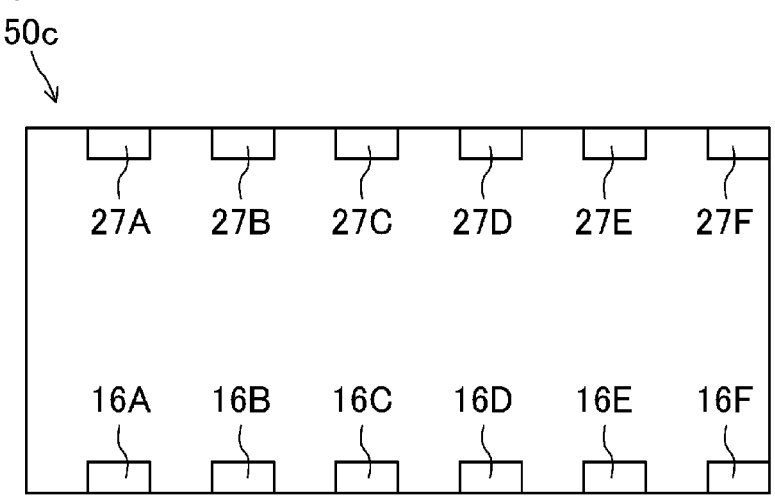
FIG. 30 is a schematic view illustrating the optical deflector according to the third embodiment in a simplified manner.
Figure 31:
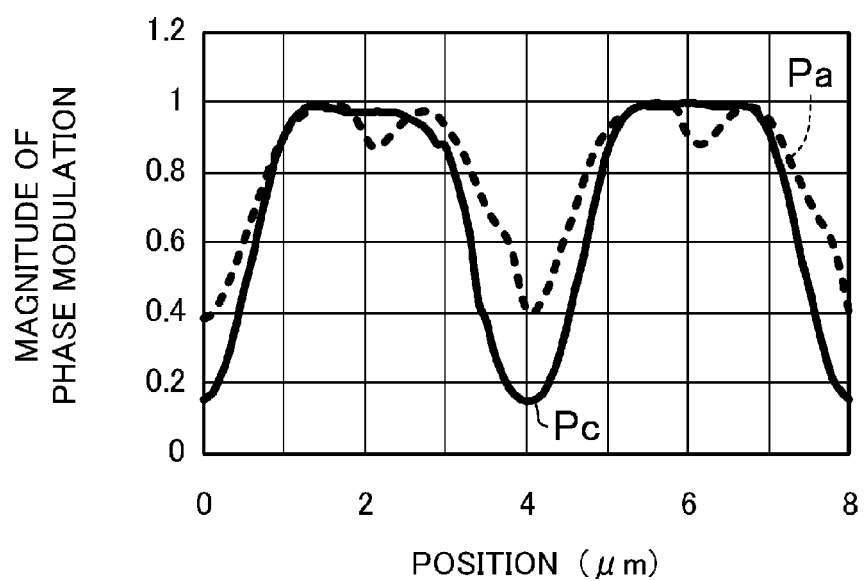
FIG. 31 is a graph illustrating the magnitude of phase modulation of the optical deflector according to the third embodiment.

Next, operation of the optical deflector 50c of the present embodiment will be described with reference to FIGS. 30 and 31. Here, FIG. 30 is a schematic view illustrating the optical deflector 50c in a simplified manner, wherein the transparent electrodes are selectively shown. FIG. 31 is a graph illustrating the magnitude of phase modulation of the optical deflector 50c. In FIG. 31, the magnitude of phase modulation along the vertical axis is in relative value of the magnitude of phase modulation normalized by using the maximum value as 1.

As illustrated in FIG. 30, in the optical deflector 50c, a signal voltage of 0 V is applied to a first transparent electrode 16A, a first transparent electrode 16C, a first transparent electrode 16E, a second transparent electrode 27A, a second transparent electrode 27C, and a second transparent electrode 27E, a signal voltage of +5 V is applied to a first transparent electrode 16B, a first transparent electrode 16D, a first transparent electrode 16F, and a signal voltage of −5 V is applied to a second transparent electrode 27B, a second transparent electrode 27D, and a second transparent electrode 27F, thereby inducing a spatial refractive index modulation region in the liquid crystal layer 40 to form a blazed diffraction grating in the liquid crystal layer 40.

As illustrated in FIG. 31, the magnitude of phase modulation of the optical deflector 50c (see the curve Pc) is greater than the magnitude of phase modulation (see the curve Pa) of the optical deflector 50a of the first embodiment.

As described above, in the optical deflector 50c of the present embodiment, in the first element substrate 20a, the grooves S (recessed lines) extend parallel to each other at a surface of the interlayer insulating layer 15a opposite to the first transparent substrate 10a, and each of the first transparent electrodes 16 is provide at the bottom B of an associated one of the grooves S. Therefore, each of projection lines corresponding to the recessed lines of the interlayer insulating layer 15a is disposed between an associated pair of the first transparent electrodes 16, which can physically reduce short circuits between the first transparent electrodes 16. In the second element substrate 30c, the grooves S (recessed lines) extend parallel to each other at a surface of the interlayer insulating layer 26a opposite to the second transparent substrate 10b, and each of the second transparent electrodes 27 is provided at the bottom B of an associated one of the grooves S. Therefore, each of projection lines corresponding to the recessed lines of the interlayer insulating layer 26a is disposed between an associated pair of the second transparent electrodes 27, which can physically reduce short circuits between the second transparent electrodes 27. The interlayer insulating layer 15a has a physical periodic structure due to the grooves S extending parallel to each other. However, the planarizing layer 17 having a refractive index equal to the refractive index of the interlayer insulating layer 15a (at least the second interlayer insulating layer 14a) fills each groove S with the first transparent electrode 16 being provided at the bottom B of the groove S. Therefore, the interlayer insulating layer 15b has no optical periodic structure. The interlayer insulating layer 26a has a physical periodic structure due to the grooves S extending parallel to each other. However, the planarizing layer 28 having a refractive index equal to the refractive index of the interlayer insulating layer 26a (at least the second interlayer insulating layer 25a) fills each groove S with the second transparent electrode 27 being provided at the bottom B of the groove S. Therefore, the interlayer insulating layer 26a has no optical periodic structure. Therefore, when a predetermined signal voltage is applied to each of the first transparent electrodes 16 of the first element substrate 20a and each of the second transparent electrodes 27 of the second element substrate 30c to operate the optical deflector 50c to form blazed diffraction gratings in the liquid crystal layer 40, control of the diffraction angle of incident light from the first transparent substrate 10a of the first element substrate 20a (or the second transparent substrate 10b of the second element substrate 30c) is ensured. Thus, unnecessary diffracted light is not likely to be included in light output from the second transparent substrate 10b of the second element substrate 30c (or the first transparent substrate 10a of the first element substrate 20a). Therefore, short circuits between the transparent electrodes are reduced, and unnecessary diffracted light during operation can be reduced.

In the optical deflector 50c of the present embodiment, the grooves S extend parallel to each other at a surface of the interlayer insulating layer 26a of the second element substrate 30c opposite to the second transparent substrate 10b, and each of the second transparent electrodes 27 is provided at the bottom B of an associated one of the grooves S. Therefore, the voltage of the liquid crystal layer 40 can be controlled not only at the first element substrate 20a but also at the second element substrate 30c, so that the magnitude of phase modulation can be increased compared to the first embodiment in which the second element substrate 30a includes a single second transparent electrode 21.

In the optical deflector 50c of the present embodiment, the second metal layers 24 are provided on a region of the first interlayer insulating layer 23 exposed from the second interlayer insulating layer 25a of the second element substrate 30c. Therefore, even when there is a residue of a metal film for forming the second metal layers 24 on the first interlayer insulating layer 23, the second interlayer insulating layer 25a is formed after the formation of the second metal layers 24. Therefore, it is possible to reduce short circuits caused by the residue of the metal film for forming the second metal layers 24 between the second transparent electrodes 27 on the second interlayer insulating layer 25a.

<Fourth Embodiment of the Invention>

Figure 32:
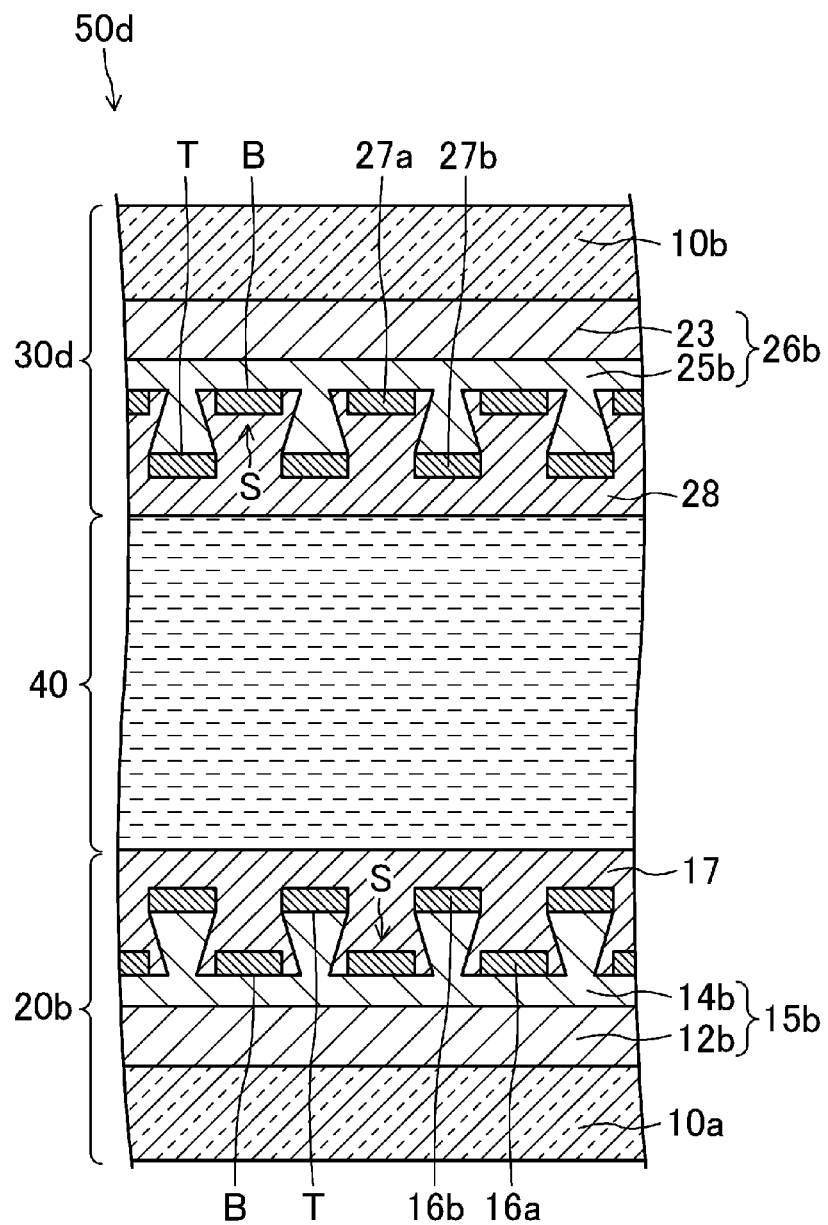
FIG. 32 is a cross-sectional view illustrating an optical deflector according to a fourth embodiment.
Figure 33:
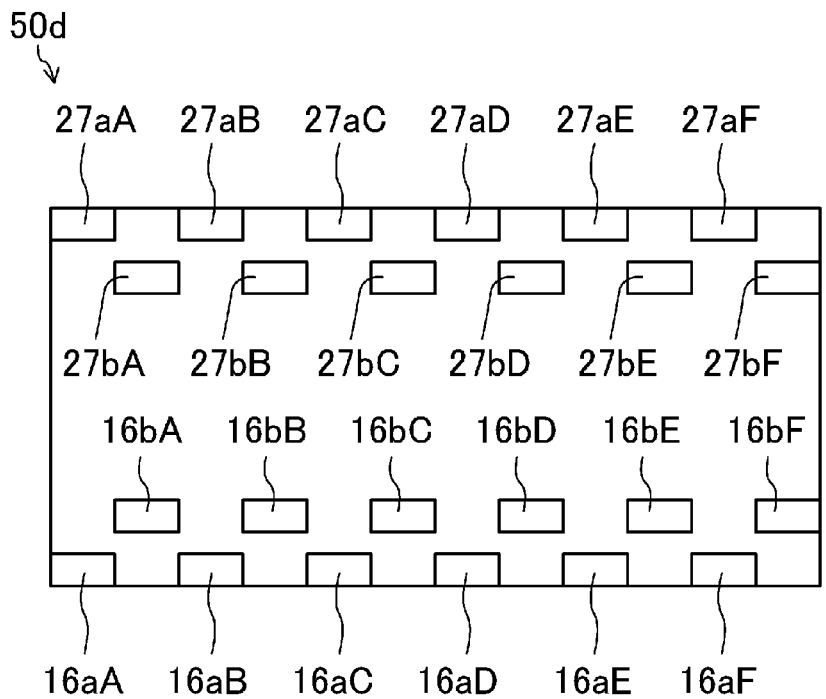
FIG. 33 is a schematic view illustrating the optical deflector according to the fourth embodiment in a simplified manner.
Figure 34:
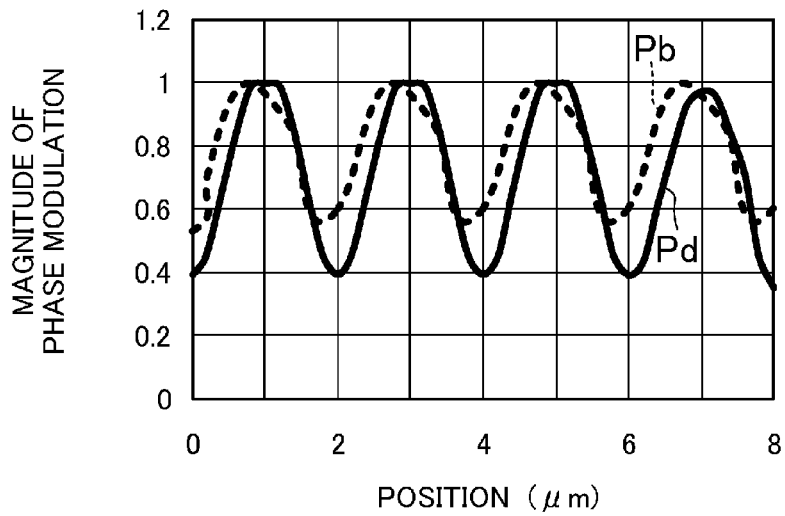
FIG. 34 is a graph illustrating the magnitude of phase modulation of the optical deflector according to the fourth embodiment.

FIGS. 32-34 illustrate a fourth embodiment of an optical deflector according to the present invention. Specifically, FIG. 32 is a cross-sectional view illustrating an optical deflector 50d of the present embodiment.

The third embodiment has described the optical deflector 50c including the second element substrate 30c in which each of the second transparent electrodes 27 is provided at the bottom B of an associated one of the grooves S in the interlayer insulating layer 26a. However, the present embodiment will describe the optical deflector 50d including a second element substrate 30d in which each of second transparent electrodes 27a is provided at a bottom B of each of grooves S in an interlayer insulating layer 26b, and each of fourth transparent electrodes 27b is provided on a corresponding one of top portions T of the interlayer insulating layer 26b.

As illustrated in FIG. 32, the optical deflector 50d includes a first element substrate 20b and the second element substrate 30d which face each other, a homogeneous alignment type liquid crystal layer 40 provided between the first element substrate 20b and the second element substrate 30d, and a sealing material (not shown) provided in a frame pattern for bonding the first element substrate 20b and the second element substrate 30d to each other and sealing the liquid crystal layer 40 between the first element substrate 20b and the second element substrate 30d.

As illustrated in FIG. 32, the second element substrate 30d includes a second transparent substrate 10b, an interlayer insulating layer 26b provided on the second transparent substrate 10b and including a first interlayer insulating layer 23 and a second interlayer insulating layer 25b in which the grooves S extend parallel to each other, the second transparent electrodes 27a each of which is provided at the bottom B of an associated one of the grooves S and which extend parallel to each other, the fourth transparent electrodes 27b each of which is provided at an associated one of the top portions T of the interlayer insulating layer 26b and which extend parallel to each other, a planarizing layer 28 covering the second transparent electrodes 27a and the fourth transparent electrodes 27b and filling the grooves S, and an alignment layer (not shown) covering the planarizing layer 28.

The refractive index of the planarizing layer 28 matches the refractive index of the interlayer insulating layer 26b within the range of about ±0.1.

Since the second element substrate 30d of the present embodiment has the substantially same configuration as the first element substrate 20b of the second embodiment, the second element substrate 30d can be fabricated by the fabrication method described in the second embodiment.

Next, operation of the optical deflector 50d of the present embodiment will be described with reference to FIGS. 33 and 34. Here, FIG. 33 is a schematic view illustrating the optical deflector 50d in a simplified manner, wherein the transparent electrodes are selectively shown. FIG. 34 is a graph illustrating the magnitude of phase modulation of the optical deflector 50d. In FIG. 34, the magnitude of phase modulation along the vertical axis is in relative value of the magnitude of phase modulation normalized by using the maximum value as 1.

As illustrated in FIG. 33, in the optical deflector 50d, a signal voltage of 0 V is applied to first transparent electrodes 16aA-16aF and second transparent electrodes 27aA-27aF, a signal voltage of +5 V is applied to third transparent electrodes 16bA-16bF, and a signal voltage of −5 V is applied to fourth transparent electrodes 27bA-27bF, thereby inducing a spatial refractive index modulation region in the liquid crystal layer 40 to form a blazed diffraction grating in the liquid crystal layer 40.

As illustrated in FIG. 34, the magnitude of phase modulation (see the curve Pd) of the optical deflector 50d is greater than the magnitude of phase modulation (see the curve Pb) of the optical deflector 50b of the second embodiment.

As described above, in the optical deflector 50d of the present embodiment, the grooves S extend parallel to each other at a surface of the interlayer insulating layer 15b of the first element substrate 20b opposite to the first transparent substrate 10a, each of the first transparent electrodes 16a is provided at the bottom B of an associated one of the grooves S, and each of the third transparent electrodes 16b is provided at an associated one of the top portions T of the interlayer insulating layer 15b, which can physically reduce short circuits between each first transparent electrode 16a and each third transparent electrode 16b. The grooves S extend parallel to each other at a surface of the interlayer insulating layer 26b of the second element substrate 30d opposite to the second transparent substrate 10b, each of the second transparent electrodes 27a is provide at the bottom B of an associated one of the grooves S, and each of the fourth transparent electrodes 27b is provided at an associated one of the top portions T of the interlayer insulating layer 26b, which can physically reduce short circuits between each second transparent electrode 27a and each fourth transparent electrode 27b. The interlayer insulating layer 15b has a physical periodic structure due to the grooves S extending parallel to each other. However, the planarizing layer 17 having a refractive index equal to the refractive index of the interlayer insulating layer 15b (at least the second interlayer insulating layer 14b) fills the grooves S with the first transparent electrode 16a being provided at the bottom B of each groove S, and the planarizing layer 17 covers the third transparent electrodes 16b on the top portions T outside the grooves S. Therefore, the interlayer insulating layer 15b has no optical periodic structure. The interlayer insulating layer 26b has a physical periodic structure due to the grooves S extending parallel to each other. However, the planarizing layer 28 having a refractive index equal to the refractive index of the interlayer insulating layer 26b (at least the second interlayer insulating layer 25b) fills the grooves S with the second transparent electrode 27a being provided at the bottom B of each groove S, and the planarizing layer 28 covers the fourth transparent electrodes 27b on the top portions T outside the grooves S. Therefore, the interlayer insulating layer 26b has no optical periodic structure. Therefore, when a predetermined signal voltage is applied to each of the first and third transparent electrodes 16a, 16b of the first element substrate 20b, and each of the second and third transparent electrodes 27a, 27b of the second element substrate 30d to operate the optical deflector 50d to form blazed diffraction gratings in the liquid crystal layer 40, control of the diffraction angle of incident light from the first transparent substrate 10a of the first element substrate 20b (or the second transparent substrate 10b of the second element substrate 30d) is ensured. Thus, unnecessary diffracted light is not likely to be included in light output from the second transparent substrate 10b of the second element substrate 30d (or the first transparent substrate 10a of the first element substrate 20b). Therefore, short circuits between the transparent electrodes are reduced, and unnecessary diffracted light during operation can be reduced.

In the optical deflector 50d of the present embodiment, the grooves S extend parallel to each other at a surface of the interlayer insulating layer 26b of the second element substrate 30d opposite to the second transparent substrate 10b, each of the second transparent electrodes 27a is provided at the bottom B of an associated one of the grooves S, and each of the fourth transparent electrodes 27b is provided on an associated one of the top portions T of the interlayer insulating layer 26b. Therefore, the voltage of the liquid crystal layer 40 can be controlled not only at the first element substrate 20b but also at the second element substrate 30d, so that the magnitude of phase modulation can be increased compared to the second embodiment in which the second element substrate 30a includes a single second transparent electrode 21.

In the optical deflector 50d of the present embodiment, each of the second transparent electrodes 27a is provided at the bottom B of an associated one of the grooves S formed in the interlayer insulating layer 26b of the second element substrate 30d, and each of the fourth transparent electrodes 27b is provided on an associated one of the top portions T of the interlayer insulating layer 26. Therefore, the second transparent electrodes 27a and the fourth transparent electrodes 27b are alternately provided in the second element substrate 30d. Therefore, in the second element substrate 30d, the pitch of the transparent electrodes is smaller than in the case where only the second transparent electrodes 27 are arranged, so that the diffraction angle θ can be increased based on the relational expression $\sin θ = \lambda/(n \times d)$.

In the optical deflector 50d of the present embodiment, each groove S in the interlayer insulating layer 15b of the first element substrate 20b and the interlayer insulating layer 26b of the second element substrate 30d is formed to have a so-called reverse tapered shape such that the width of the groove increases toward the bottom B of the groove S. Therefore, in the first element substrate 20b, the first transparent electrodes 16a can be separated from the third transparent electrodes 16b in a self-aligning manner. In the second element substrate 30d, the second transparent electrodes 27a can be separated from the fourth transparent electrodes 27b of the second element substrate 30d in a self-aligning manner.

Although the above embodiments exemplify the optical deflectors including a homogeneous alignment type liquid crystal layer made of a nematic liquid crystal material whose dielectric constant anisotropy is positive, the present invention is applicable to optical deflectors including a liquid crystal layer made of a ferroelectric liquid crystal material, optical deflectors including homeotropic alignment type liquid crystal layer made of a nematic liquid crystal material whose dielectric constant anisotropy is negative, or the like.

Industrial Applicability

As described above, the present invention provides an optical deflector in which short circuits between transparent electrodes are reduced, and unnecessary diffracted light during operation is reduced, and thus the present invention is useful for parallax barriers for 3D display which is capable of tracking the position of an observer, laser displays, optical scanners, an optical switches for optical communication, or the like.

DESCRIPTION OF REFERENCE CHARACTERS

B Bottom
S Groove
The Top Portion
10a First Transparent Substrate
10b Second Transparent Substrate
12a, 12b, 23 First Interlayer Insulating Layer
13, 13a, 13b First Metal Layer
14a, 14b, 25a, 25b Second Interlayer Insulating Layer
15a, 15b, 26a, 26b Interlayer Insulating Layer
16, 16a First Transparent Electrode
16b Third Transparent Electrode
17, 28 Planarizing Layer
20a, 20b First Element Substrate
21, 27, 27a Second Transparent Electrode
24 Second Metal Layer
27b Fourth Transparent Electrode
30a, 30c, 30d Second Element Substrate
40 Liquid Crystal Layer
50a-50d Optical Deflector

The invention claimed is:
1. An optical deflector comprising:
a first element substrate including
   a first transparent substrate,
   an interlayer insulating layer which is provided on the first transparent substrate and in which a plurality of grooves extend parallel to each other,
   a plurality of first transparent electrodes which extend parallel to each other and each of which is provided at a bottom of an associated one of the grooves in the interlayer insulating layer, and
   a planarizing layer covering the first transparent electrodes, filling the grooves, and having a refractive index equal to a refractive index of the interlayer insulating layer;
a second element substrate including
   a second transparent substrate, and
   a second transparent electrode provided on the second transparent substrate to face the planarizing layer of the first element substrate, and
a liquid crystal layer provided between the first element substrate and the second element substrate.
2. The optical deflector of claim 1, further comprising a plurality of third transparent electrodes extending parallel to each other, wherein
the interlayer insulating layer has a plurality of top portions each located between an associated pair of the grooves, and
each of the third transparent electrodes is provided between an associated one of the top portions and the planarizing layer.
3. The optical deflector of claim 2, wherein
the first transparent electrodes are extended to one end of the first element substrate, and
the third transparent electrodes are extended to the other end of the first element substrate.
4. The optical deflector of claim 1, wherein
the second element substrate includes
   an interlayer insulating layer which is provided on the second transparent substrate and in which a plurality of grooves extend parallel to each other, and
   a planarizing layer filling the grooves and having a refractive index equal to a refractive index of the interlayer insulating layer of the second element substrate, and
the second transparent electrode includes a plurality of second transparent electrodes which extend parallel to each other and each of which is provided between a bottom of an associated one of the grooves in the interlayer insulating layer of the second element substrate and the planarizing layer of the second element substrate.
5. The optical deflector of claim 4, further comprising:
a plurality of fourth transparent electrodes extending parallel to each other, wherein
the interlayer insulating layer of the second element substrate has a plurality of top portions each located between an associated pair of the grooves in the interlayer insulating layer of the second element substrate, and
each of the fourth transparent electrodes is provided between an associated one of the top portions and the planarizing layer of the second element substrate.
6. The optical deflector of claim 4, wherein
the interlayer insulating layer of the second element substrate includes a first interlayer insulating layer facing the second transparent substrate, and a second interlayer insulating layer which is provided on the first interlayer insulating layer and in which the grooves are formed, and a plurality of second metal layers are provided on a region of the first interlayer insulating layer of the second element substrate exposed from the second interlayer insulating layer of the second element substrate so as to be each connected to an associated one of the second transparent electrodes.

7. The optical deflector of claim 1, wherein
in at least one of the first element substrate or the second element substrate, the planarizing layer covers the interlayer insulating layer.

8. The optical deflector of claim 1, wherein
in at least one of the first element substrate or the second element substrate, the interlayer insulating layer and the planarizing layer are made of an identical material.

9. The optical deflector of claim 1, wherein
in at least one of the first element substrate or the second element substrate, each groove in the interlayer insulating layer has a width increasing toward the bottom of the groove.

10. The optical deflector of claim 1, wherein
the interlayer insulating layer of the first element substrate includes
a first interlayer insulating layer facing the first transparent substrate, and
a second interlayer insulating layer which is provided on the first interlayer insulating layer and in which the grooves are formed, and a plurality of first metal layers are provided on a region of the first interlayer insulating layer exposed from the second interlayer insulating layer so as to be each connected to an associated one of the first transparent electrodes.

\* \* \* \* \*